United States Patent [19]
Maki et al.

[11] Patent Number: 5,558,076
[45] Date of Patent: Sep. 24, 1996

[54] FUEL METERING CONTROL SYSTEM FOR INTERNAL COMBUSTION ENGINE

[75] Inventors: Hidetaka Maki; Shusuke Akazaki; Yusuke Hasegawa; Yoichi Nishimura, all of Wako, Japan

[73] Assignee: Honda Giken Kogyo Kabushiki Kaisha, Tokyo, Japan

[21] Appl. No.: 514,857

[22] Filed: Aug. 14, 1995

[30] Foreign Application Priority Data

Feb. 25, 1995 [JP] Japan ................................. 7-061660

[51] Int. Cl.$^6$ .......................... F02D 41/14; F02D 43/00
[52] U.S. Cl. ...................... 123/687; 123/694; 123/696
[58] Field of Search ........................... 123/90.15, 687, 123/694, 696

[56] References Cited

U.S. PATENT DOCUMENTS

| | | | |
|---|---|---|---|
| 4,674,028 | 6/1987 | Shioya et al. | 364/157 |
| 4,922,412 | 5/1990 | Lane et al. | 364/157 |
| 5,220,904 | 6/1993 | Miyashita et al. | 123/687 X |
| 5,443,050 | 8/1995 | Hitomi et al. | 123/681 X |
| 5,462,037 | 10/1995 | Hasegawa et al. | 123/694 X |

FOREIGN PATENT DOCUMENTS

| | | |
|---|---|---|
| 2-275043 | 11/1990 | Japan . |
| 4-209940 | 7/1992 | Japan . |
| 5-52140 | 3/1993 | Japan . |

OTHER PUBLICATIONS

Computrol (Corona Publishing Co., Ltd.) No. 27, pp. 28–41.
Automatic Control Handbook (Ohm Publishing Co., Ltd.) pp. 703–707.

"A Survey of Model Reference Adaptive Techniques—Theory and Applications" by I.D. Landau, *Automatica*, vol. 10, pp. 353–379, 1974.

"Unification of Discrete Time Explicit Model Reference Adaptive Control Designs" by I. D. Landau et al, *Automatica*, vol. 17, No. 4, pp. 593–611, 1981.

"Combining Model Reference Adaptive Controllers and Stochastic Self-tuning Regulators" by I. D. Landau, *Automatica* vol. 18, No. 1, pp. 77–84, 1982.

*Primary Examiner*—Tony M. Argenbright
*Attorney, Agent, or Firm*—Nikaido Marmelstein Murray & Oram LLP

[57] ABSTRACT

A fuel metering control system for an internal combustion engine, having a feedback loop. In the system, the quantity of fuel injection (Tim) to be supplied to the engine (plant) is determined outside of the feedback loop. A first feedback correction coefficient (KSTR) is calculated using an adaptive law, while a second feedback correction coefficient (KLAF(KSTRL)), whose control response is inferior to the first feedback correction coefficient is calculated using a PID control law. The feedback correction coefficients are calculated such that the plant output (air/fuel ratio) is brought to a desired value (desired air/fuel ratio). The engine is equipped with a variable valve timing mechanism which switches the valve timing between characteristics for low engine speed and those for high engine speed. If the characteristic for high engine speed is selected, the second feedback correction coefficient is used for fuel injection quantity correction.

26 Claims, 16 Drawing Sheets

FUEL METERING CONTROL SYSTEM FOR INTERNAL COMBUSTION ENGINE

BACKGROUND OF THE INVENTION

1. Field of the Invention

This invention relates to a fuel metering control system for an internal combustion engine.

2. Description of the Prior Art

The PID control law is ordinarily used for fuel metering control for internal combustion engines. The control error between the desired value and the manipulated variable (control input) is multiplied by a P term (proportional term), an I term (integral term) and a D term (differential or derivative term) to obtain the feedback correction coefficient (feedback gain). In addition, it has recently been proposed to obtain the feedback correction coefficient by use of modern control theory or the like. As the control response is relatively high in such cases, however, it may under some engine operating conditions become necessary to use a lower control response in order to prevent the control from becoming unstable owing to controlled variable fluctuation or oscillation.

It has therefore been proposed, as in Japanese Laid-Open Patent Application No. Hei 4(1992)-209,940, to calculate a first feedback correction coefficient using modern control theory, calculate a second feedback correction coefficient whose control response is inferior to (or lesser than) that of the first feedback correction coefficient using the PI control law, and determine the controlled variable using the second feedback correction coefficient during engine deceleration, when combustion is unstable. For a similar reason, Japanese Laid-Open Patent Application No. Hei 5(1993)-52,140 proposes determining the controlled variable using a second feedback correction coefficient of inferior control response when the air/fuel ratio sensor is in the semi-activated state. In U.S. patent application No. 08/401,430 filed on Mar. 9, 1995, for example, the assignee proposes a system for determining the quantity of fuel injection using an adaptive controller.

In fuel metering control, the supply of fuel is shut off during cruising and certain other operating conditions and, as shown in FIG. 17, it is controlled in an open-loop (O/L) fashion during the fuel cutoff period. Then when the fuel supply is resumed for obtaining a stoichiometric air/fuel ratio (14.7:1), for example, fuel is supplied based on the quantity of fuel injection determined in accordance with an empirically obtained characteristic. As a result, the true air/fuel ratio (A/F) jumps from the lean side to 14.7. However, a certain amount of time is required for the supplied fuel to be combusted and for the combusted gas to reach the air/fuel ratio sensor. In addition, the air/fuel ratio sensor has a detection delay time. Because of this, the detected air/fuel ratio is not always the same as the true air/fuel ratio but, as shown by the broken line in FIG. 17, involves a relatively large error.

At this time, as soon as the high-control-response feedback correction coefficient (illustrated as KSTR in the figure) is determined based on a control law such as the adaptive control law proposed by the assignee, the adaptive controller determines the feedback correction coefficient KSTR so as to immediately eliminate the error between the desired value and the detected value. As this difference is caused by the sensor detection delay and the like, however, the detected value does not indicate the true air/fuel ratio. Since the adaptive controller nevertheless absorbs the relatively large difference all at one time, KSTR fluctuates widely as shown in FIG. 17, thereby also causing the controlled variable to fluctuate or oscillate and degrading the control stability.

It is therefore preferable to determine one feedback correction coefficient of high control response using a control law such as the adaptive control law and another feedback correction coefficient of low control response using a control law such as the PID control law (illustrated as KLAF in the figure) and to select one or the other of the feedback correction coefficients depending on the engine operating condition. Since the different types of control laws have different characteristics, however, a sharp difference in level may arise between the two correction coefficients. Because of this, switching between the correction coefficients is liable to destabilize the controlled variable and degrade the control stability. None of the aforesaid prior art references offer any measure for overcoming this problem.

Moreover, when the engine is equipped with a variable valve timing mechanism which switches the opening/closing timing of the intake and/or exhaust valves between two types of characteristics, i.e., the characteristic for low-engine-speed and that for high-engine-speed, a large amount of valve timing overlap present when the high engine speed characteristic is selected is apt to cause intake air blowby (escape of intake air through the exhaust valve). At that situation, the detected exhaust ratio is not likely to be stable. The condition may therefore become different from that of the high-control-response feedback correction coefficient such as that determined by an adaptive control law, which may occasionally make it impossible to continue the feedback control using the high-control-response feedback correction coefficient.

An object of the invention is therefore to provide a fuel metering control system for an internal combustion engine which determines feedback correction coefficients different in control response using multiple types of control laws and which smooths the switching between the feedback correction coefficients, while ensuring the continuities of feedback control even when the engine is equipped with a variable valve timing mechanism that switches the opening/closing timing of the intake and/or exhaust valves between a plurality of characteristics.

SUMMARY OF THE INVENTION

This invention achieves these objects by providing a system for controlling fuel metering for an internal combustion engine, comprising, air/fuel ratio detecting means for detecting an air/fuel ratio (KACT) of an exhaust gas of the engine, engine operating condition detecting means for detecting an operating condition of the engine, fuel injection quantity determining means for determining a quantity of fuel injection (Tim) to be supplied to the engine, first feedback correction coefficient calculation means for calculating a first feedback correction coefficient (KSTR) using a first control law having an algorithm expressed in a recursion formula, second feedback correction coefficient calculation means for calculating a second feedback correction coefficient (KLAF(KSTRL)) whose control response is inferior to that of the first feedback correction coefficient using a second control law, switching means for switching the first feedback correction coefficient (KSTR) and the second feedback correction coefficient (KLAF(KSTRL)) therebetween, and feedback control means for correcting a manipulated variable by the switched one of the feedback correction coefficients (KSTR, KLAF(KSTRL)) to bring at least one of the detected air/fuel ratio (KACT) and the quantity of fuel injection (Tim) to a desired value (KCMD). The characterisitic features are that said engine is provided with a mechanism having an actuator which switches an operating condition of an engine valve, engine valve operation switching means is provided for switching the operating condition of the engine valve through the actuator between a first characteristic (LoV/T) for a low engine speed and a second characteristic (HiV/T) for a high engine speed, and said feedback control means corrects the manipulated variable by the second feedback correction coefficient (KLAF(KSTRL)) when said engine valve operation switching means switches the operating condition of the engine valve to the second characteristic (HiV/T).

BRIEF EXPLANATION OF THE DRAWINGS

These and other objects and advantages of the invention will be more apparent from the following description and drawings, in which.

DETAILED DESCRIPTION OF THE PREFERRED EMBODIMENTS

Embodiments of the invention will now be explained with reference to the drawings.

Figure 1:
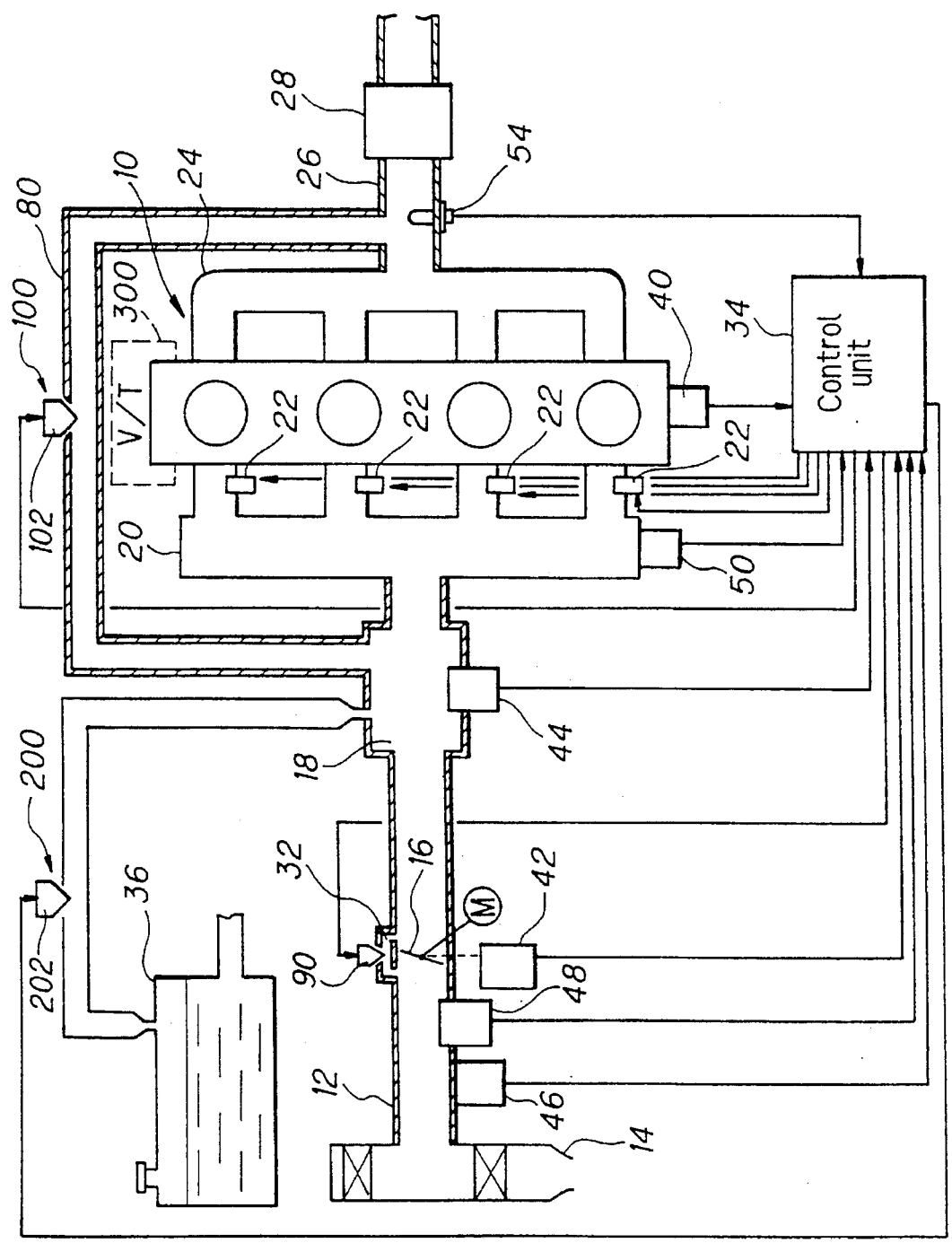
FIG. 1 is an overall block diagram showing a fuel metering control system according to the invention.

FIG. 1 is an overview of a fuel metering control system for an internal combustion engine according to the invention.

Reference numeral 10 in this figure designates an OHC in-line four-cylinder internal combustion engine. Air drawn in an air intake pipe 12 through an air cleaner 14 mounted on a far end thereof is supplied, while being adjusted by a throttle valve 16, to the first to fourth cylinders through a surge tank 18, an intake manifold 20 and two intake valves (not shown). A fuel injector 22 for injecting fuel is installed in the vicinity of the intake valves of each cylinder. The injected fuel mixes with the intake air to form an air-fuel mixture that is ignited in the associated cylinder by a spark plug (not shown). The resulting combustion of the air-fuel mixture drives down a piston (not shown).

The exhaust gas produced by the combustion is discharged through two exhaust valves (not shown) into an exhaust manifold 24, from where it passes through an exhaust pipe 26 to a catalytic converter (three-way catalyst) 28 where noxious components are removed therefrom before being discharged to the atmosphere. Not mechanically linked with the accelerator pedal (not shown), the throttle valve 16 is controlled to the desired degree of opening by a stepping motor M. In addition, the throttle valve 16 is bypassed by a bypass 32 provided in the vicinity thereof.

The engine 10 is equipped with an exhaust gas recirculation mechanism 100 and with a canister purge mechanism 200 connected between the air intake system and a fuel tank 36. Since these mechanisms are unrelated to the principle of the invention, however, they will not be explained in detail.

The engine 10 is also equipped with a mechanism which switches an operating condition of the intake and/or exhaust valve of the engine, more specifically, a variable valve timing mechanism 300 (denoted as V/T in FIG. 1). As taught by Japanese Laid-open Patent Application No. Hei 2(1990)-275,043, for example, the variable valve timing mechanism 300 switches the opening/closing timing of the intake and/or exhaust valves between a plurality of, i.e., two types of timing characteristics, i.e, the characteristic for low-engine-speed named LoV/T and that for high-engine-speed named HiV/T in response to engine speed Ne and manifold pressure Pb. This will be again described later.

A crank angle sensor 40 for detecting the piston crank angles is provided in the distributor (not shown) of the internal combustion engine 10, a throttle position sensor 42 is provided for detecting the degree of opening of the throttle valve 16, and a manifold absolute pressure sensor 44 is provided for detecting the pressure of the intake manifold downstream of the throttle valve 16 in terms of the absolute value.

An atmospheric pressure sensor 46 for detecting atmospheric pressure is provided at an appropriate portion of the engine 10, an intake air temperature sensor 48 for detecting the temperature of the intake air is provided upstream of the throttle valve 16, and a coolant temperature sensor 50 for detecting the temperature of the engine coolant is provided at an appropriate portion of the engine. The engine 10 is further provided with a valve timing (V/T) sensor 52 (not shown in FIG. 1) which detects the valve timing characteristic selected by the variable valve timing mechanism 300 based on oil pressure.

Further, an air/fuel ratio sensor 54 constituted as an oxygen detector or oxygen sensor, is provided at the exhaust pipe 26 at, or downstream of, a confluence point in the exhaust system between the exhaust manifold 24 and the catalytic converter 28, where it detects the oxygen concentration in the exhaust gas at the confluence point and produces a signal (explained later). The outputs of all the sensors are sent to a control unit 34.

Figure 2:
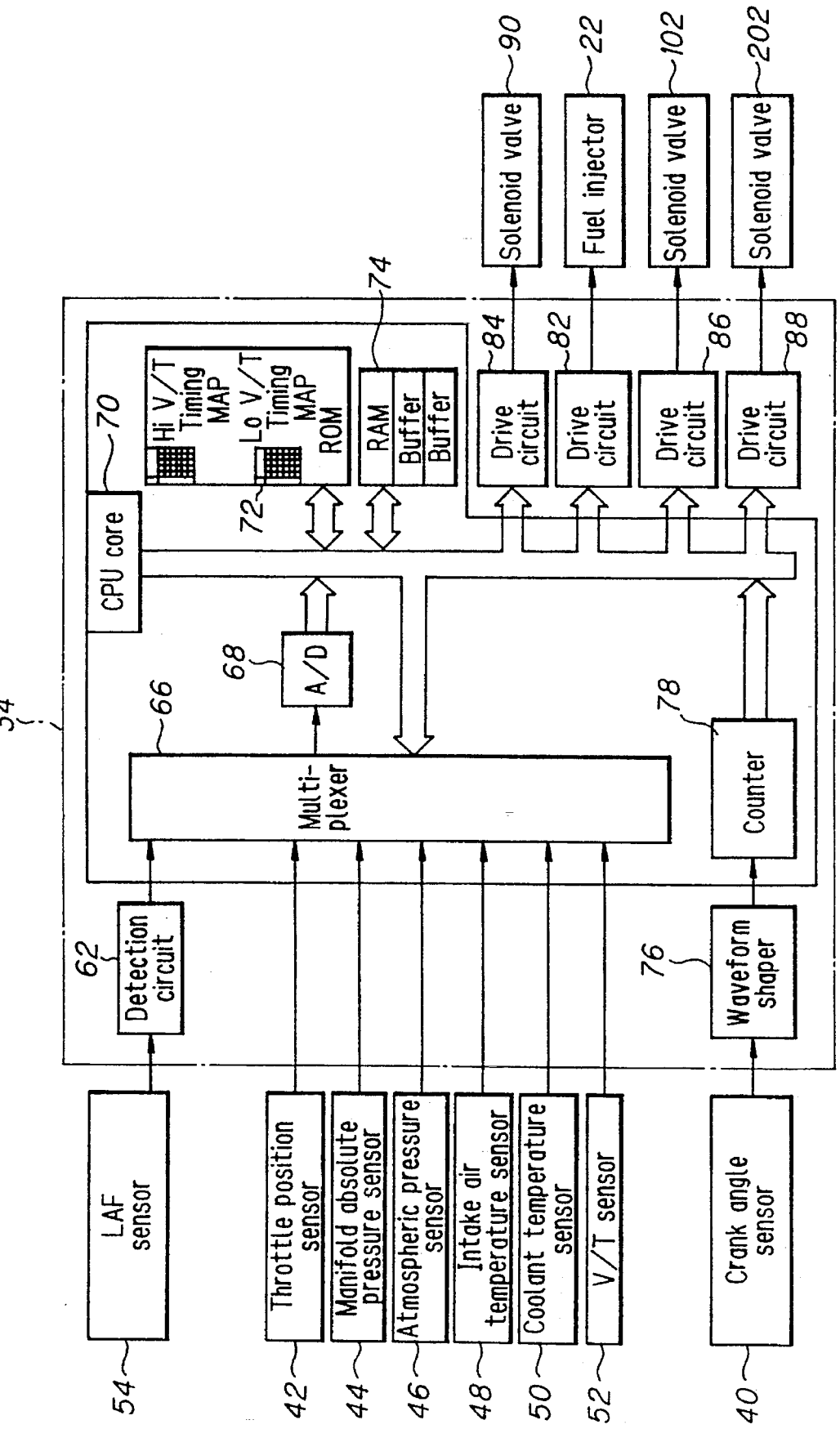
FIG. 2 is a block diagram showing the details of the control unit illustrated in FIG. 1.

Details of the control unit 34 are shown in the block diagram of FIG. 2. The output of the air/fuel ratio sensor 54 is received by a detection circuit 62, where it is subjected to appropriate linearization processing for producing an output characterized in that it varies linearly with the oxygen concentration of the exhaust gas over a broad range extending from the lean side to the rich side. (The air/fuel ratio sensor will be referred to as "LAF sensor" in the figure and the remainder of this specification.)

The output of the detection circuit 62 is forwarded through a multiplexer 66 and an A/D converter 68 to a CPU (central processing unit). The CPU has a CPU core 70, a ROM (read-only memory) 72 and a RAM (random access memory) 74 and the output of the detection circuit 62 is A/D-converted once every prescribed crank angle (e.g., 15 degrees) and sequentially stored in buffers of the RAM 74. Similarly, the analog outputs of the throttle position sensor 42, etc., are input to the CPU through the multiplexer 66 and the A/D converter 68 and stored in the RAM 74.

The output of the crank angle sensor 40 is shaped by a waveform shaper 76 and has its output value counted by a counter 78. The result of the count is input to the CPU. In accordance with commands stored in the ROM 72, the CPU core 70 computes a manipulated variable in the manner described later and drives the fuel injectors 22 of the respective cylinders via a drive circuit 82. Operating via drive circuits 84, 86 and 88, the CPU core 70 also energizes/deenergizes a solenoid valve (EACV) 90 (for opening and closing the bypass 32 to regulate the amount of secondary air), a solenoid valve 102 for controlling the amount of recirculated exhaust gas, and a solenoid valve 202 for controlling the amount of canister purge.

Figure 3:
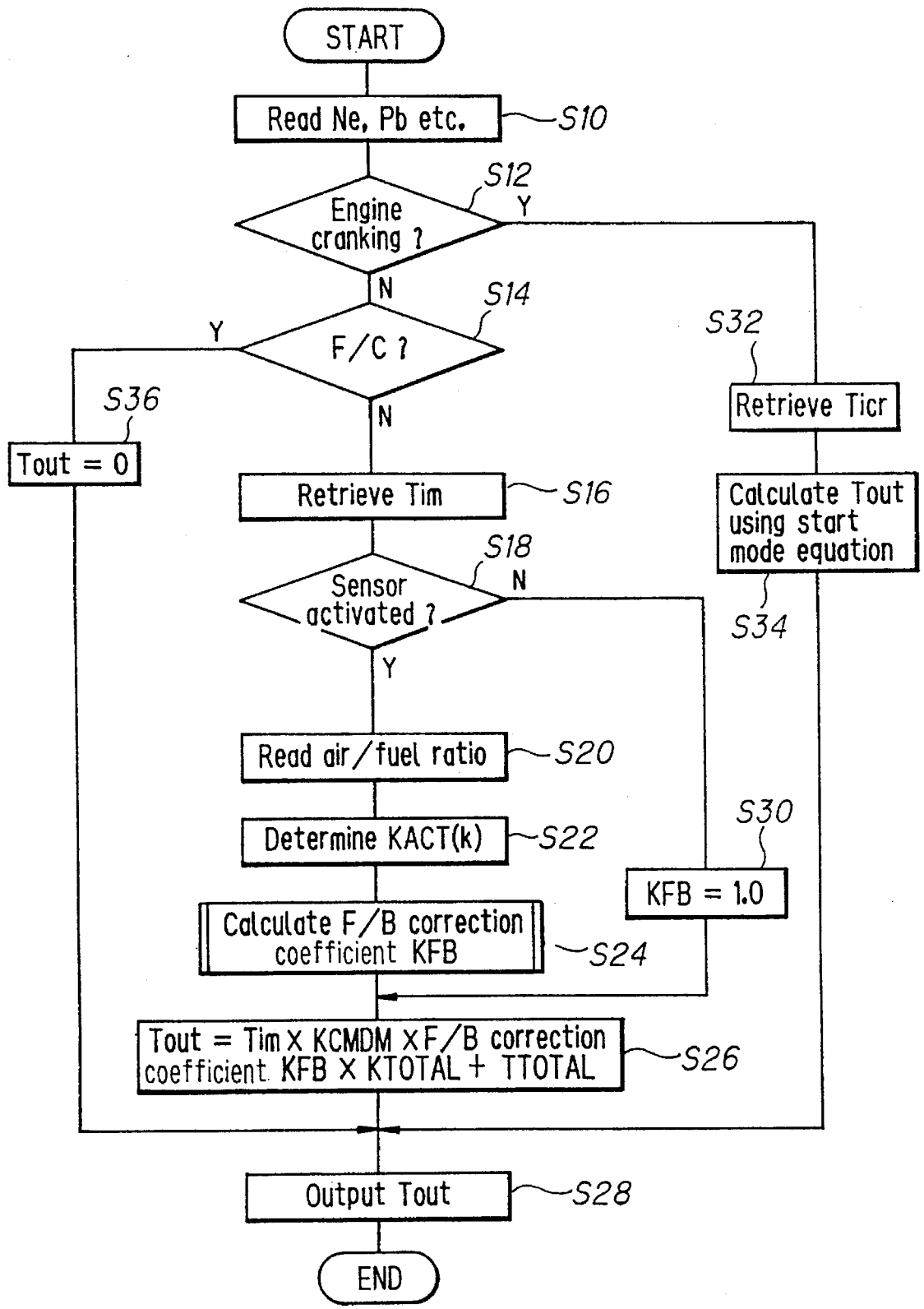
FIG. 3 is a flowchart showing the operation of the fuel metering control system according to the invention.

FIG. 3 is a flowchart showing the operation of the system. The routine of FIG. 3 is activated once every prescribed crank angle.

Figure 4:
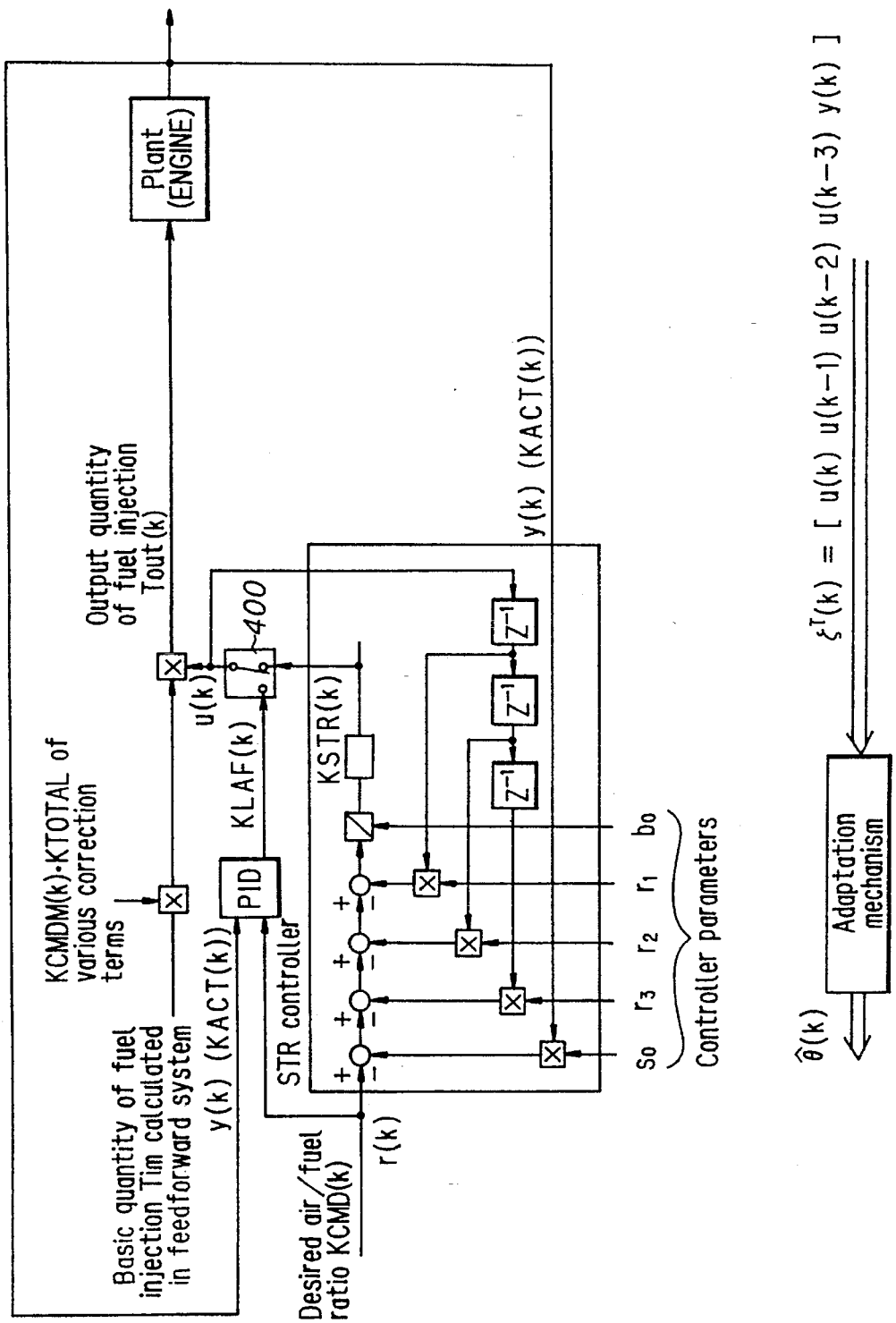
FIG. 4 is a block diagram similarly showing the operation of the system more functionally.

FIG. 4 is a block diagram illustrating the operation of the system more functionally. First explaining the system with reference to FIG. 4, the system is provided with a first calculation means constituted as an adaptive controller (STR type adaptive controller; indicated as an "STR controller" in the figure), which uses the adaptive control law based on a recursion formula to calculate a first feedback correction coefficient (indicated as "KSTR(k)" in the figure) so as to bring the detected air/fuel ratio (indicated as "KACT(k)") to a desired air/fuel ratio (indicated as "KCMD(k)") using the quantity of fuel injection as the manipulated variable (k: the sample number in discrete-time system).

In addition, the system is provided with a second calculation means constituted as a PID controller (indicated as "PID" in the figure), which uses a second type of control law, specifically, which uses the PID control law, to calculate a second feedback correction coefficient (indicated as "KLAF(k)"), that is inferior in control response (lesser in control response) than the first feedback correction coefficient, so as to cause the detected air/fuel ratio KACT to equal the desired value KCMD similarly using the quantity of fuel injection as the manipulated variable. The output of the first calculation means or the second calculation means is selected based on the engine operating condition detected in the manner described latter, and the basic quantity of fuel injection Tim (calculated in a feed-forward system in accordance with an empirically determined characteristic and stored as mapped data retrievable by engine speed and manifold pressure) is multiplied by the selected coefficient to obtain the output quantity of fuel injection Tout.

Based on the above, the operation of the system will be explained with reference to FIG. 3.

In FIG. 3, the program starts at S10 in which the detected engine speed Ne and manifold pressure Pb, etc., are read, and proceeds to S12 in which a check is made as to whether or not the engine is cranking, and if it is not, to S14 in which a check is made as to whether the supply of fuel has been cut off. Fuel cutoff is implemented under specific engine operating conditions, such as when the throttle is fully closed and the engine speed is higher than a prescribed value, at which time the supply of fuel is stopped and open-loop control is effected.

If it is found in S14 that fuel cutoff is not implemented, the program proceeds to S16 in which the basic quantity of fuel injection Tim is calculated by retrieval from the aforesaid map using the detected engine speed Ne and manifold pressure Pb as address data. Next, the program proceeds to S18 in which it is checked whether activation of the LAF sensor 54 is complete. This is done by comparing the difference between the output voltage and the center voltage of the LAF sensor 54 with a prescribed value (0.4 V, for example) and determining that activation is complete when the difference is smaller than the prescribed value.

If S18 finds that activation is complete, the program goes to S20 in which the output of the LAF sensor is read, to S22 in which the air/fuel ratio KACT(k) is determined or calculated from the output, and to S24 in which the feedback correction coefficient KFB (the general name for KSTR and KLAF) is calculated. As mentioned earlier, k is used to mean a discrete variable in the specification and the sample number in the discrete-time system.

Figure 5:
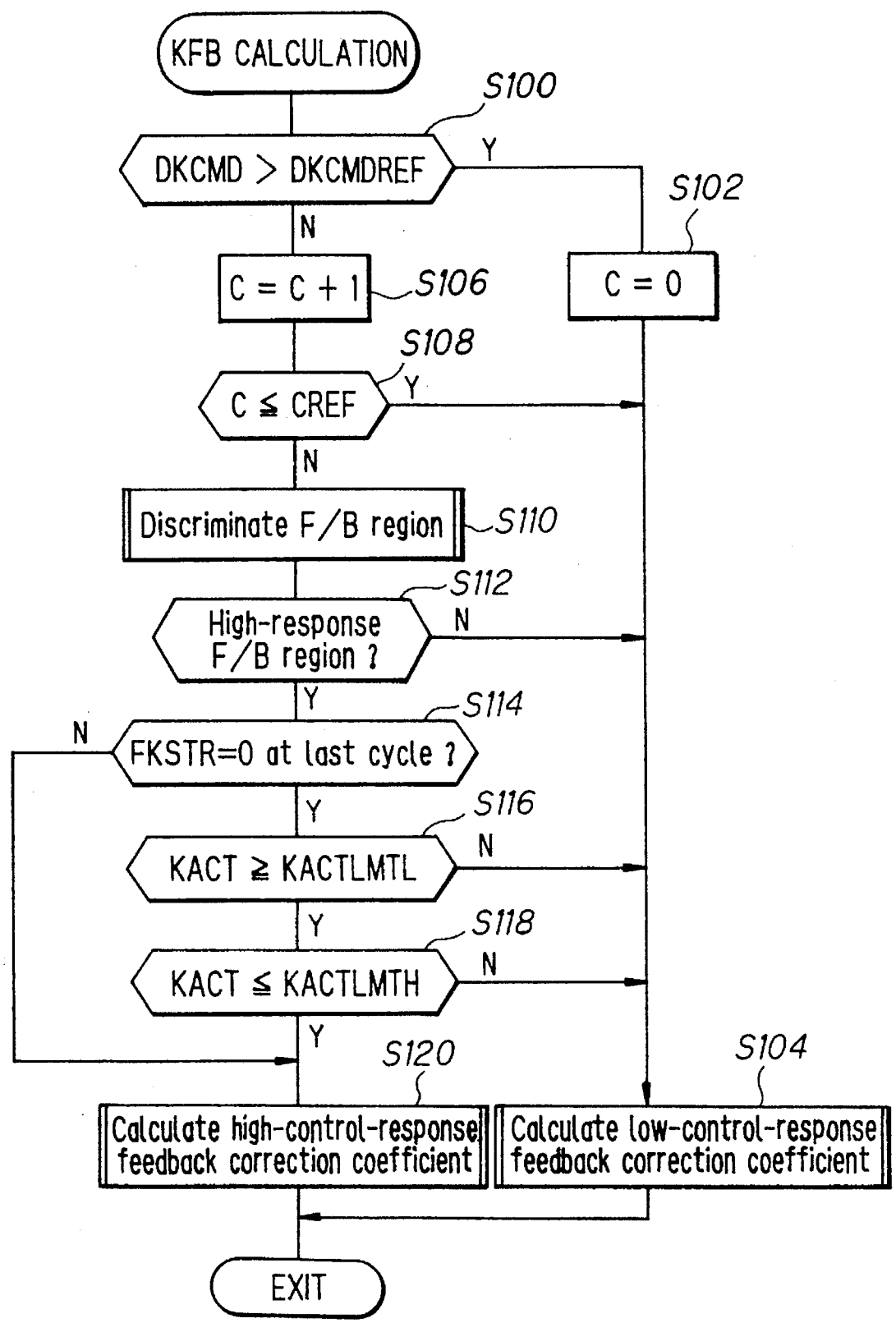
FIG. 5 is a subroutine flowchart of FIG. 3 showing the calculation of a feedback correction coefficient KFB.

The subroutine for this calculation is shown by the flowchart of FIG. 5.

The program begins at S100 in which the desired air/fuel ratio change DKCMD (i.e., the difference in absolute value between the value at the current control (program) cycle and the preceding control (program) cycle $$DKCMD=KCMD(k)-KCMD(k-1)$$

is calculated and it is then checked whether the change DKCMD is greater than a reference value DKCMDREF, and if it is, to S102 in which a counter value C is reset to zero, to S104 in which the low-control-response feedback correction coefficient is calculated. The coefficient is the aforesaid second one KLAF. This will be hereinafter referred to as "PID correction coefficient" or "KLAF".

Figure 6:
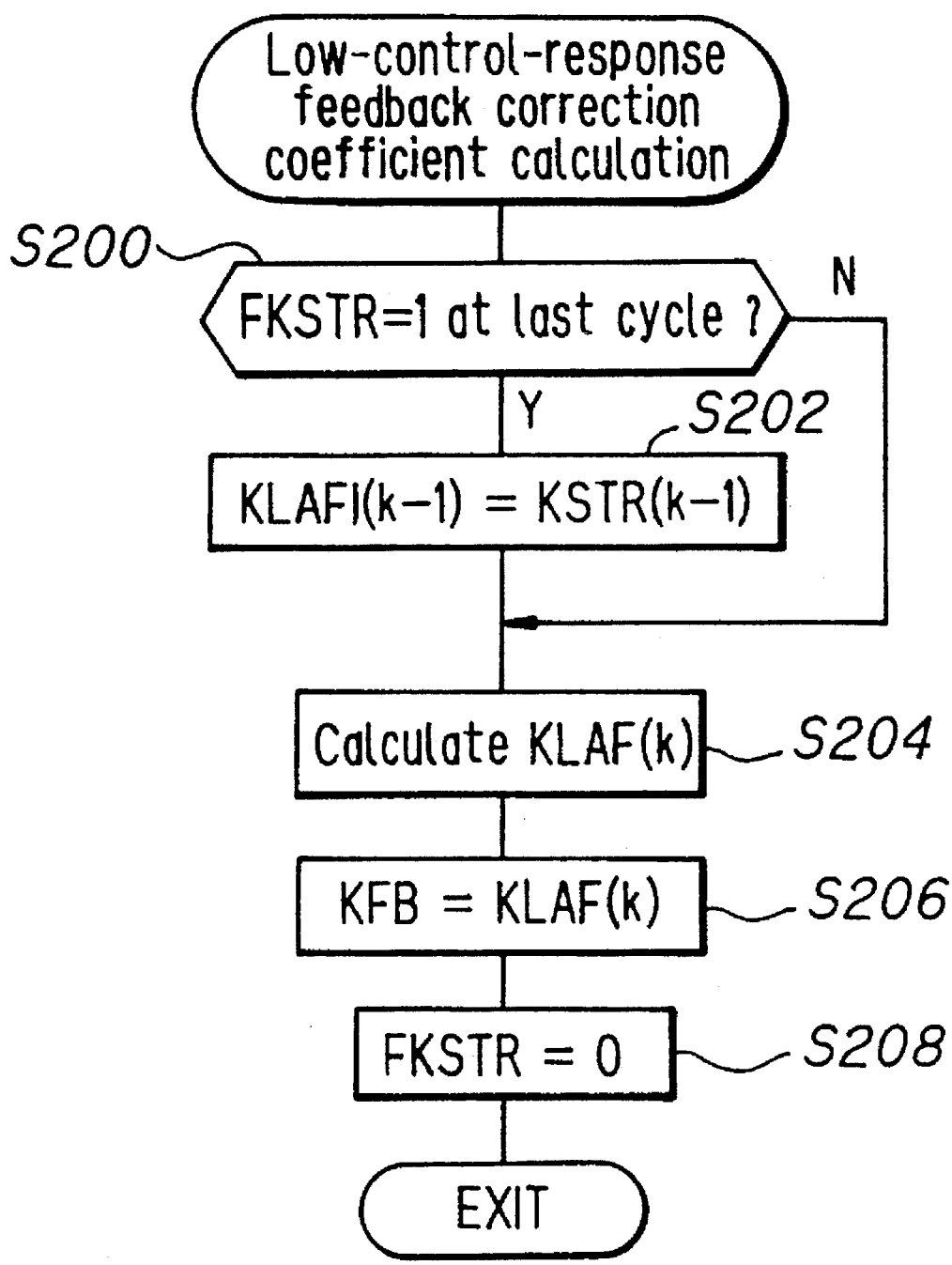
FIG. 6 is a subroutine flowchart of FIG. 5 showing the calculation of a low-control-response feedback correction coefficient.

FIG. 6 is a subroutine flowchart of the calculation.

First in S200, it is checked whether the bit of a flag FKSTR was set to 1 at the preceding control cycle, i.e., at the time the routine of FIG. 3 was activated in the preceding control cycle. The flag's bit is set to 1 when the quantity of fuel injection is corrected using the aforesaid first feedback correction coefficient KSTR (here-inafter referred to as "adaptive correction coefficient" or "KSTR"), as will be explained later. In other words, it is checked in the step whether the adaptive correction coefficient KSTR was used for the fuel injection quantity correction at the last control cycle. If the result is affirmative, the program goes to S202 in which the value of KSTR at the preceding cycle is set to or replaced with KLAFI(k−1) (I (integral) term of the PID correction coefficient KLAF at the last control cycle)(explained later), to S204 in which the PID correction coefficient KLAF(k) is calculated. The calculation is carried out as follows.

First, the control error DKAF between the desired air/fuel ratio KCMD and the detected air/fuel ratio KACT is calculated as:

$$DKAF(k)=KCMD(k-d')-KACT(k).$$

In this equation, KCMD(k−d') is the desired air/fuel ratio (in which d' indicates the dead time before KCMD is reflected in KACT and thus signifies the desired air/fuel ratio before the dead time control cycle), and KACT(k) is the detected air/fuel ratio (in the current control (program) cycle). In this embodiment, however, the desired value KCMD and the detected value KACT are represented as the equivalence ratio so as to facilitate the calculation, namely, as Mst/M= 1/lambda (Mst: stoichiometric air/fuel ratio, M=A/F (A: air mass flow rate, F: fuel mass flow rate), and lambda=excess air factor).

Next, the control error DKAF(k) is multiplied by specific coefficients to obtain variables, i.e., the P (proportional) term KLAFP(k), I (integral) term KLAFI(k), and D (differential or derivative) term KLAFD(k) as P term: $KLAFP(k)=DKAF(k) \times KP$ I term: $KLAFI(k)=KLAFI(k-1)+DKAF(k) \times KI$ D term: $KLAFD(k)=(DKAF(k)-DKAF(k-1)) \times KD$.

Thus, the P term is calculated by multiplying the error by the proportional gain KP, the I term is calculated by adding the value of KLAFI(k−1), the feedback correction coefficient in the preceding control cycle (k−1), to the product of the error and the integral gain KI, and the D term is calculated by multiplying the difference between the value of DKAF(k), the error in the current control cycle (k), and the value of DKAF(k−1), the error in the preceding control cycle (k−1), by the differential gain KD. The gains KP, KI and KD are calculated based on the engine speed and the engine load. Specifically, they are retrieved from a map using the engine speed Ne and the manifold pressure Pb as address data. Finally, KLAF(k), the value of the feedback correction coefficient according to the PID control law in the current control cycle, is calculated by summing the thus-obtained values:

$$KLAF(k)=KLAFP(k)+KLAFI(k)+KLAFD(k).$$

In this case, the offset of 1.0 is assumed to be included in the I term KLAFI(k) so that the feedback correction coefficient is a multiplication coefficient (namely, the I term KLAFI(k) is given an initial value of 1.0).

In the above, when the I term is replaced in S202, the replaced value is used for the KLAF calculation. This is because, the I term may change suddenly when the adaptive correction coefficient KSTR is switched to the PID correction coefficient KLAF. By determining the initial value of the I term of the PID correction coefficient KLAF using the value of the adaptive correction coefficient KSTR in this way, the level difference between the adaptive correction coefficient and the PID correction coefficient can be reduced to prevent sudden change in the controlled variable and ensure stable control.

The program next advances to S206 in which the PID correction coefficient KLAF is set as the feedback correction coefficient KFB, and to S208 in which the bit of the flag FKSTR is reset to 0 to indicate that fuel injection quantity correction is carried out using the PID correction coefficient KLAF. That is, when returning from open-loop to closed-loop control as in the case where fuel supply is resumed after once being cut off, the detected air/fuel ratio value is not always the true value due to the sensor detection delay or some similar reasons, rendering control unstable. It is therefore arranged such that the feedback correction coefficient of lower control response is used. The same will be applied to the case where a large variation occurs in the desired air/fuel ratio such as at the time of resuming feedback control following full-load enrichment or resuming stoichiometric air/fuel ratio control following lean-burn control, etc.

Returning to the explanation of the FIG. 5 flowchart, when the result at S100 is negative, the program goes to S106 in which the counter value C is incremented, to S108 in which it is judged whether the counter value C is at or below a predetermined value CREF. If S108 finds that the counter value C is less than the predetermined value CREF, the program proceeds to S104 since the time lapse after the desired air/fuel changed largely is short and is insufficient for absorbing the lag time until combustion has been completed and the sensor's detection delay time. On the other hand, if S108 finds the counter value is not less than the predetermined value, the program moves to S110 in which the operating region is discriminated as to whether it is one in which the feedback control is to be conducted using the high-control-response feedback correction coefficient (adaptive correction coefficient KSTR) or using the low-control-response feedback correction coefficient (PID correction coefficient KLAF).

Figure 7:
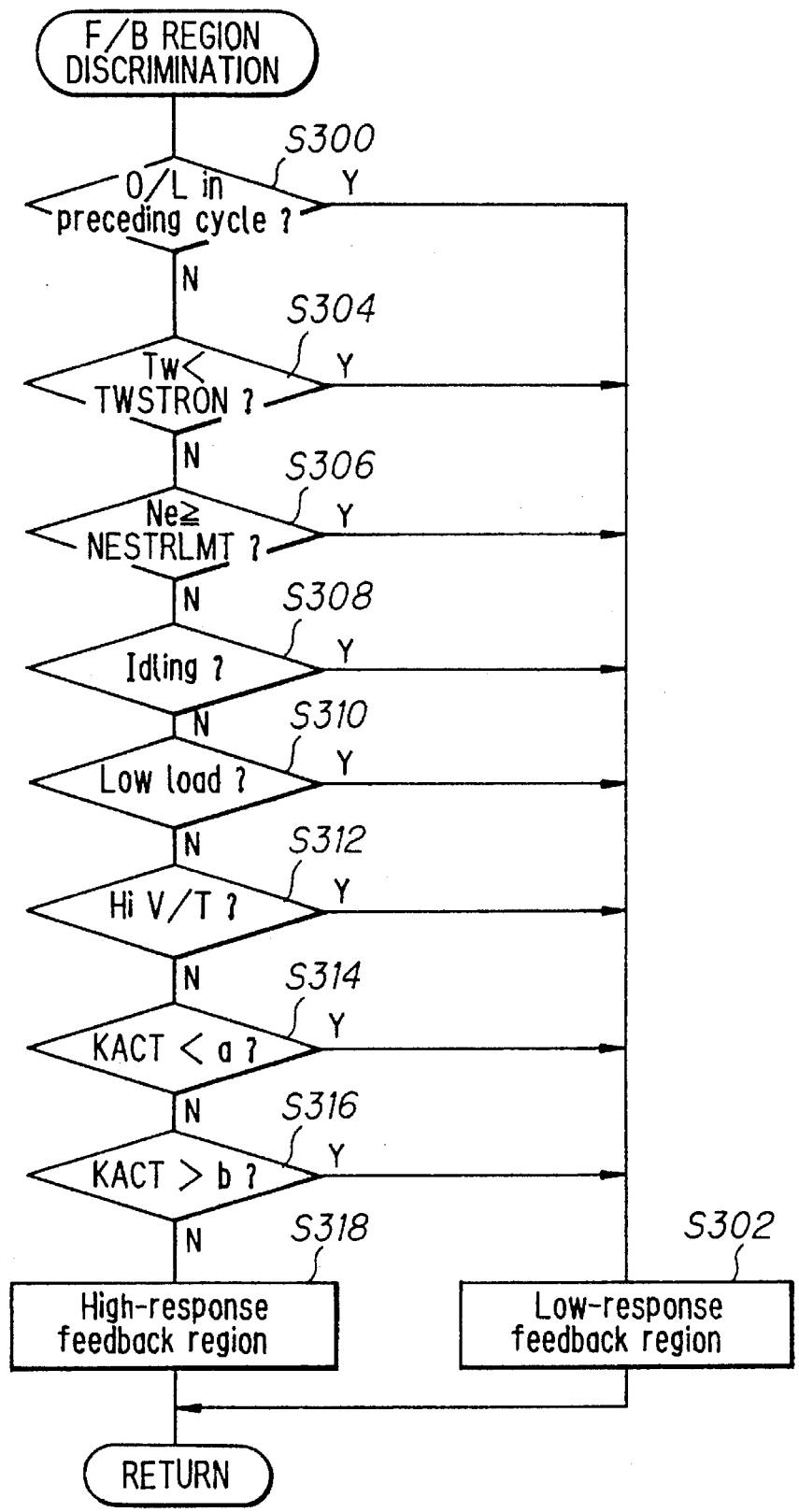
FIG. 7 is a subroutine flowchart of FIG. 5 showing the discrimination of a feedback control region.

FIG. 7 is the flowchart of a subroutine for this region discrimination.

First, in S300, it is checked whether open-loop control was in effect at the preceding control cycle, i.e., at the time the subroutine of FIG. 3 was activated in the preceding control cycle. This is conducted using a separate subroutine not shown in the drawings. Open loop control is implemented, for example, when the engine operating condition has changed suddenly, such as during full-load enrichment, high engine speed, or when the exhaust gas recirculation mechanism is operating.

If the result is YES, the program goes to S302 in which the region is determined to be one in which feedback control is to be conducted using the low-control-response feedback correction coefficient (PID correction coefficient KLAF) (hereinafter referred to as the "low-response feedback region"). This is because, for the reason explained earlier, it is preferable not to conduct high-response feedback control immediately after returning from open-loop control. In changing from open-loop control to feedback control it is possible to conduct low-response feedback control for a prescribed period (5 TDCs, for example (TDC: Top Dead Center)). In such case, it suffices to provide a discrimination step after S300 for continuously directing the program to S302 during the prescribed period.

If the result in S300 is NO, the program goes to S304 in which it is checked whether the engine coolant temperature Tw is less than a prescribed value TWSTRON. The prescribed value TWSTRON is set at a relatively low coolant temperature and if the detected engine coolant temperature TW is below the prescribed value TWSTRON, the program proceeds to S302 in which the engine operating condition is determined to be in the low-response feedback region. The reason for this is that the combustion is unstable at low coolant temperatures, making it impossible to obtain a stable detection of the value KACT owing to misfiring and the like. Although not shown in FIG. 7, for the same reason, the operating conditions is also determined to be in the low-response feedback region when the coolant temperature is abnormally high.

If S304 finds that the engine coolant temperature TW is not lower than the prescribed value TWSTRON, the program advances to S306 in which it is checked whether the detected engine speed Ne is at or above a prescribed value NESTRLMT. The prescribed value NESTRLMT is set at a relatively high engine speed. If S306 finds that the detected engine speed Ne is at or above the prescribed value NESTRLMT, the program goes to S302 in which the operating condition is determined to be in the low-response feedback region. This is because during high-speed engine operation there tends to be insufficient time for calculation and, moreover, combustion is unstable.

If S306 finds that the detected engine speed Ne is lower than the prescribed value NESTRLMT, the program proceeds to S308 in which it is checked whether the engine is idling. If the result is YES, the program goes to S302 in which the operating condition is determined to be in the low-response feedback region. This is because the generally stable operating condition during idling obviates the need for a high gain such as that according to the adaptive control law.

If S308 finds that the engine is not idling, the program proceeds to S310 in which it is judged whether the engine load is low. If the result is YES, the program goes to S302 in which the operating condition is determined to be in the low-response feedback region. This is because combustion is not stable in the low engine load region.

If S310 finds that the engine load is not low, the program proceeds to S312 in which a check is made whether HiV/T (high-engine-speed side valve timing) is selected in the variable valve timing mechanism. If so, the program proceeds to S302 in which the operating condition is determined to be in the low-response feedback region.

The operation of a control unit (not shown) of the variable valve timing mechanism will here be explained with reference to the flowchart of FIG. 8.

First, in S400, the engine speed Ne and the manifold pressure Pb are read and the program goes to S402 in which mapped data stored in the ROM 72 is retrieved by the engine speed Ne and the manifold pressure Pb to determine which valve timing control region, or characteristic, that the engine operation falls into. The engine coolant temperature Tw can be additionally used to make the determination.

Figure 9:
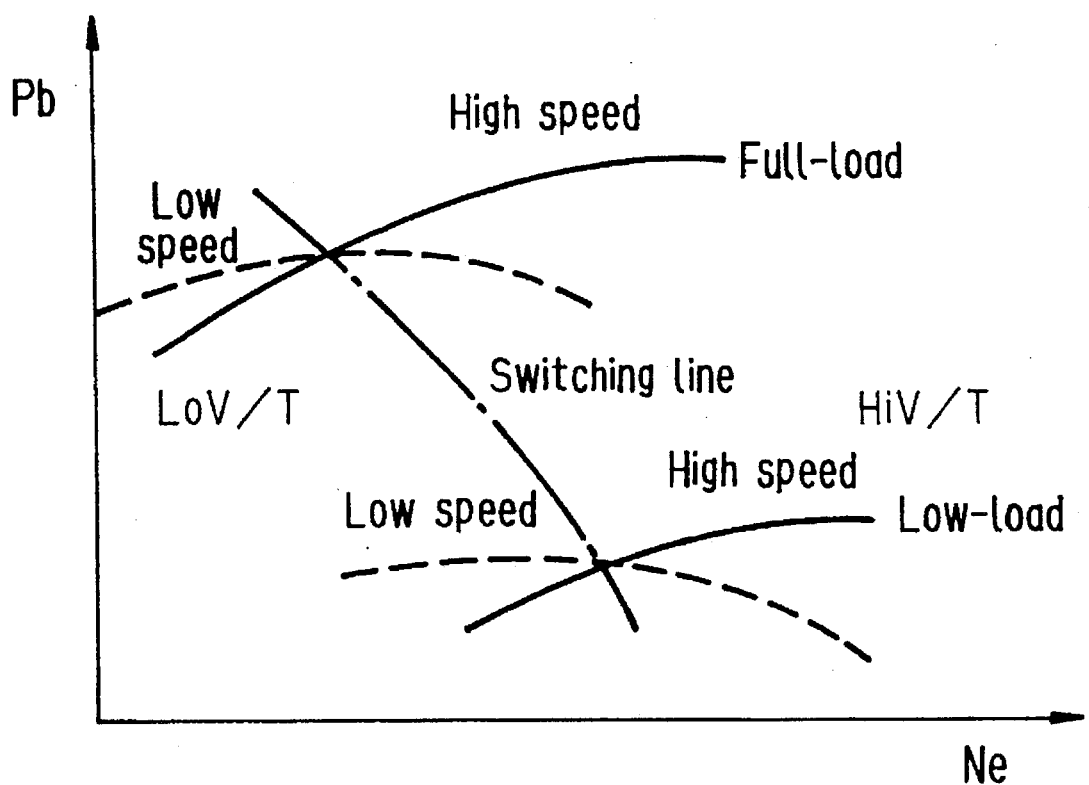
FIG. 9 is a graph showing the valve timing switching characteristics of the variable valve timing mechanism.

FIG. 9 is a graph showing the characteristics of the mapped data. As illustrated, the engine operating condition is divided into two regions by the switching line, i.e., the region or characteristic for low-engine-speed (LoV/T) and the other for high-engine-speed (HiV/T). The switching line shifts to the higher engine direction with decreasing engine load (manifold pressure Pb). In S402, it is thus determined which valve timing control region or characteristic should be selected by the detected engine parameters. The program then proceeds to S404 in which the determined valve timing control region or characteristic is discriminated and if LoV/T is to be selected, the program advances to S406 in which a command is issued to switch to LoV/T, while if not, to S408 in which a command is issued for HiV/T.

Returning to the explanation of FIG. 7, the judgment at S310 is made by referring to the command issued at S406 or S408. And when the command to switch to the HiV/T control region is issued, the region is determined to be the low-response feedback region. This is because if a large amount of valve timing overlap is present when the high-engine-speed side valve timing characteristic, this is selected is apt to cause intake air blowby (escape of intake air through the exhaust valve), in which case the detected value KACT is not likely to be stable. In addition, the detection delay of the LAF sensor cannot be ignored during high-speed operation.

More specifically, in the adaptive control disclosed, since the controller parameter vector $\hat{\theta}(k)$ is obtained from the cause and effect relationship of $u(k)=KSTR(k)$ and $KACT(k)$ as will be explained later, the control can not be carried out effectively unless a relatively accurate value of $KACT(k)$ is sampled at every control cycle. For that reason, the region is determined to be the low-response feedback one when HiV/T is selected, such that the PID correction coefficient KLAF is used for correction. In addition, when valve timing is being switched from LoV/T to HiV/T, the detected air/fuel ratio KACT is apt to be unstable due to the sudden change in the engine operation. When the feedback correction coefficient is to be switched from KSTR to KLAF at that instant, the coefficient KSTR may be erroneously determined based on the unstable KACT, since KSTR has a high response. Therefore, since KLAFI is replaced with $KSTR(k-1)$ in S202, if the coefficient is switched to the PID correction coefficient KLAF, more specifically, switched from $KSTR(k-1)$ to $KLAF(k)$, the PID correction coefficient KLAF may start from an appropriate value.

On the other hand, the PID correction coefficient is inferior in control response to the adaptive correction coefficient and takes more time for the improper value to converge to a proper value. Furthermore, the valve timing can not always be switched in all cylinders at one time, and some cylinders may temporarily have a valve timing different from other cylinders at, for example, the transient engine operating condition.

In order to solve this problem, it is configured in the embodiment that the feedback correction coefficient is immediately switched to KLAF when the valve timing control unit has issued the command to switch the valve timing from the VoV/T to the HiV/T control region. In addition, it is arranged in this embodiment that the valve timing control unit brings an actuator such as a hydraulic circuit (not shown) to operate to actually establish the HiV/T characteristic, after confirming that the quantity of fuel injection has been corrected using the KLAF.

Figure 10:
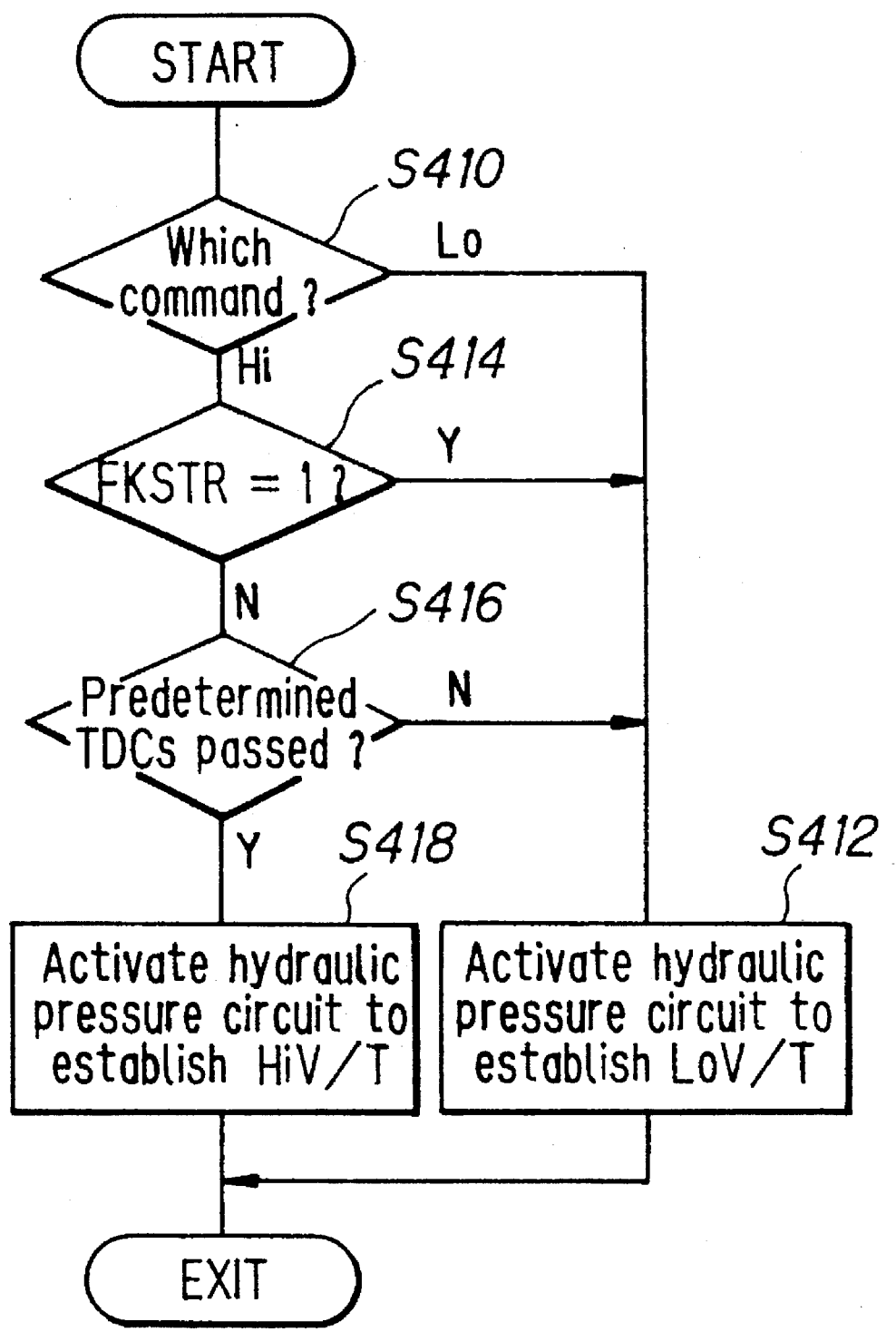
FIG. 10 is a flowchart, similar to FIG. 8, but showing the operation of the control unit of the variable valve timing mechanism according to the embodiment.

This will be explained with reference to the flowchart of FIG. 10 showing the operation of the control unit of the variable valve timing mechanism. Actually, the procedures shown here are carried out after the procedures shown in FIG. 5 have been finished for the reason just mentioned.

Figure 8:
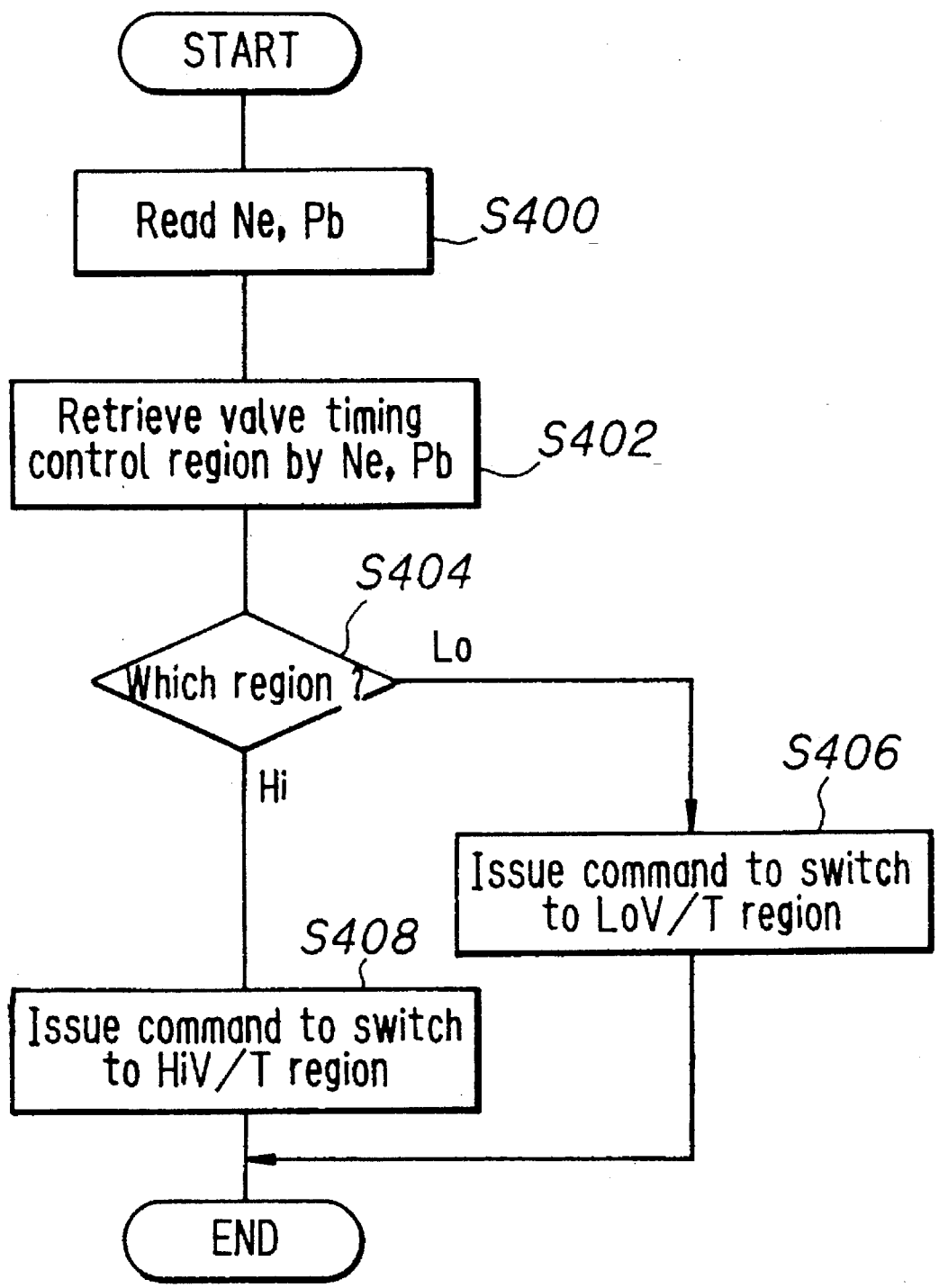
FIG. 8 is a flowchart showing the operation of a control unit of a variable valve timing mechanism provided with the engine shown in FIG. 1.

In FIG. 10, it is first discriminated whether the command issued at the procedures in FIG. 8 is for HiV/T or LoV/T and if S410 finds that the command is for LoV/T, the program proceeds to S412 in which the hydraulic pressure circuit is actuated such that the LoV/T characteristic is established. On the other hand, when S410 finds the command was for HiV/T, the program proceeds to S414 in which it is checked whether the bit of the flag FKSTR has been set to 1 which indicates that the fuel injection quantity correction is carried out using KSTR. If the result is affirmative, since this means that the feedback correction coefficient has not been changed to KLAF, the program again goes to S412.

On the other hand, if the result at S414 is negative, since this means that the coefficient has been changed to KLAF, the program goes, after confirming at S416 that a time lapse corresponding to a predetermined number of TDCs has passed, i.e., combustion has continued to present for the predetermined period since the correction by KLAF took place. Then, the program goes to S418 in which the hydraulic pressure circuit is activated to establish the HiV/T characteristic. Thus, it is configured such that the valve timing switching is carried out in correlation with the change of feedback correction coefficient. To be more specific, switching from LoV/T to HiV/T is only carried out after it has been confirmed that the coefficient has been changed to the PID correction coefficient and, in addition, that combustion has been present for a predetermined number of TDCs thereafter. This arrangement can solve the above-mentioned problem and as a result, improve control stability.

Returning to FIG. 7, if the result in S312 is NO, the program goes to S314 in which it is checked whether the detected air/fuel ratio KACT is below a prescribed value a. If the result is YES, the program goes to S302. If NO, it goes to S316 in which a check is made as to whether the detected value KACT is greater than a prescribed value b. If the result is YES, the program goes to S302. If NO, it goes to S318 in which the operating condition is determined to be in a region in which feedback control is to be conducted using a high-control-response feedback correction coefficient (feedback correction coefficient KSTR) (hereinafter referred to as the "high-response feedback region"). The prescribed values a and b are appropriately set for enabling discrimination of lean and rich air/fuel ratios since it is better to avoid high-response control such as adaptive control when the air/fuel ratio is lean or rich. In making the discrimination, the desired air/fuel ratio can be used in place of the detected air/fuel ratio for comparison with the prescribed values.

Returning to the subroutine of FIG. 5, it is then checked in S112 whether the region is determined to be the high-control-response feedback region. If the result is NO, the program goes to S104. If the result is YES, on the other hand, the program proceeds to S114 in which it is checked whether the flag FKSTR's bit was reset to 0 at the preceding control cycle and if the result is affirmative, i.e., if the coefficient used in the last control cycle was KLAF, to S116 in which it is checked whether the detected value KACT is at or greater than a prescribed lower limit KACTLMTL (similar to the value a in S314)(e.g., 0.95), and if it is, to S118 in which it is checked whether the detected value KACT is at or lesser than a prescribed upper limit KACTLMTH (similar to the value b in S316) (e.g., 1.05).

When the result at S116 or S118 is negative, the program proceeds to S104. When the results are all affirmative at these steps, the program goes to S120 in which the high-control-response feedback correction coefficient, i.e., the feedback correction coefficient KSTR is calculated using the adaptive control law. In other words, it is configured such that switching from PID to adaptive control is carried out when the detected equivalence ratio is found to be 1.0 or thereabout, thereby enhancing the control stability.

Figure 11:
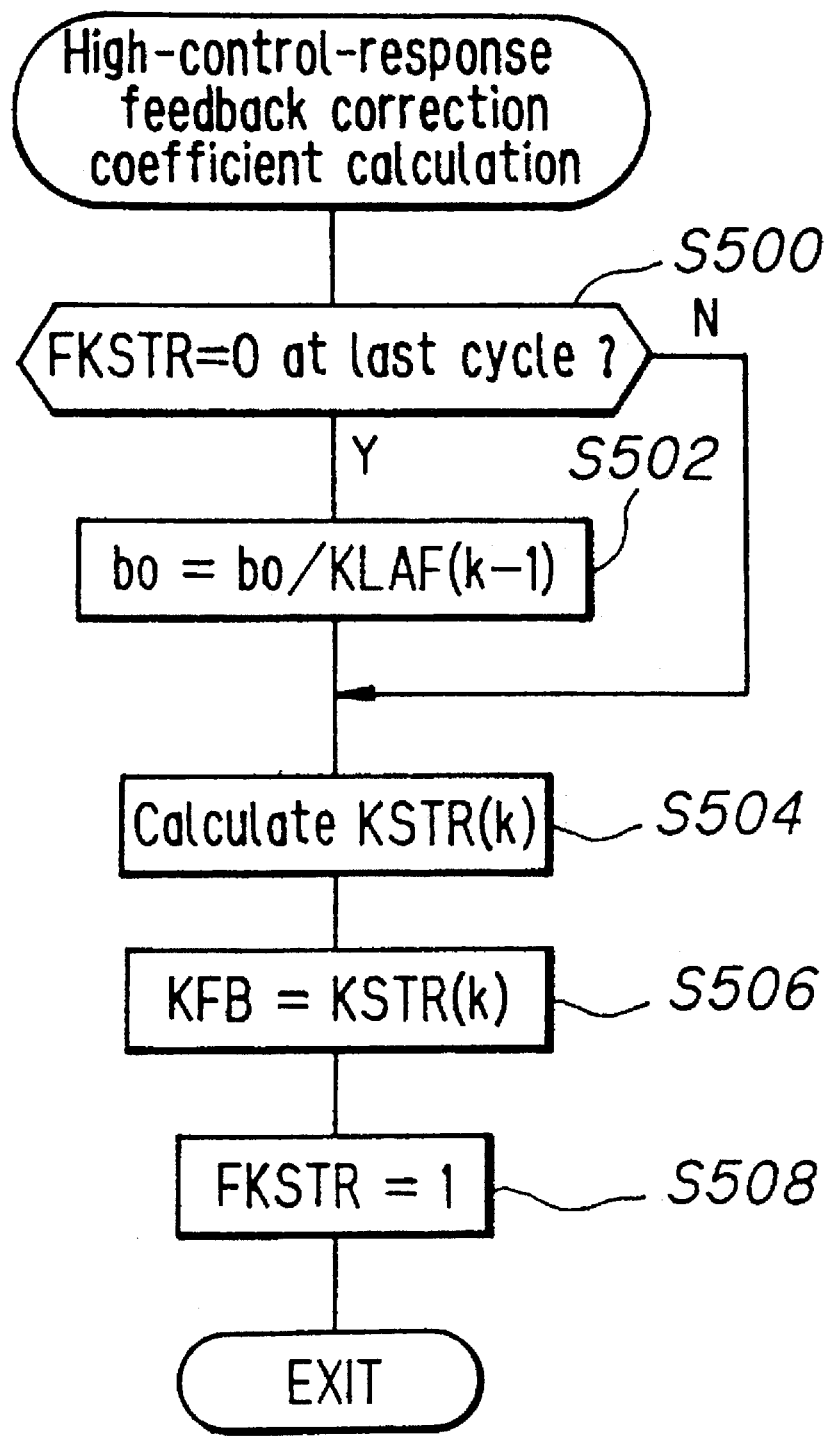
FIG. 11 is a subroutine flowchart of FIG. 5 showing the calculation of a high-control-response feedback correction coefficient.

FIG. 11 is a flowchart for the KSTR calculation.

First, in S500, it is checked whether the flag FKSTR's bit was reset to 0 at the preceding cycle, in other words, it is judged whether the PID correction coefficient was used for the fuel injection quantity correction at the last control cycle and if it is, the program proceeds, via S502 (explained later), to S504 in which the correction coefficient is calculated using the adaptive control law.

This calculation will now be explained. The adaptive controller shown in FIG. 4 comprises an adaptive controller constituted as an STR controller (first feedback correction coefficient calculation means) and an adaptation mechanism (system parameter estimator) for estimating/identifying the controller parameters (system parameters). The desired value KCMD(k) and the controlled variable y(k) (plant output) of the fuel metering control feedback system are input to the STR controller, which receives a coefficient vector estimated/identified by the adaptation mechanism and generates the control input u(k).

One identification algorithm available for the adaptive control is that proposed by I. D. Landau et al. This method is described in, for example, *Computrol* (Corona Publishing Co., Ltd.) No. 27, pp. 28–41; *Automatic Control Handbook* (Ohm Publishing Co., Ltd.) pp. 703–707, "A Survey of Model Reference Adaptive Techniques—Theory and Applications" by I. D. Landau in *Automatica*, Vol. 10, pp. 353–379; "Unification of Discrete Time Explicit Model Reference Adaptive Control Designs" by I. D. Landau et al in *Automatica*, Vol. 17, No. 4, pp. 593–611; and "Combining Model Reference Adaptive Controllers and Stochastic Self-tuning Regulators" by I. D. Landau in *Automatica*, Vol. 18, No. 1, pp. 77–84.

The identification algorithm proposed by I. D. Landau et al. is used in the illustrated adaptive controller. In the identification algorithm proposed by I. D. Landau, if the polynomials of the denominator and numerator of the transfer function $A(Z^{-1})/B(Z^{-1})$ of the discrete controlled system are defined in the manner of Eq. 1—1 and Eq. 1-2 shown below, then the controller parameters or system (adaptive) parameters $\theta(k)$ which are made up of parameters as shown in Eq. 1-3 and are expressed as a vector (transpose vector). And the input zeta (k) to the adaptation mechanism become that shown by in Eq. 1-4 (transpose vector). Here, there is taken as an example a plant in which m=1, n=1 and d=3, namely, the plant model is given in the form of linear system with three control cycles of dead time:

$$A(z^{-1}) = 1 + a_1 z^{-1} + \ldots + a_n z^{-n} \quad \text{Eq. 1-1}$$

$$B(z^{-1}) = b_0 + b_1 z^{-1} + \ldots + b_m z^{-m} \quad \text{Eq. 1-2}$$

$$\begin{aligned}
\hat{\theta}^T(k) &= [\hat{b}_0(k), \hat{B}_R(z^{-1}, k), \hat{S}(z^{-1}, k)] \\
&= [\hat{b}_0(k), \hat{r}_1(k), \ldots, r_{m+d-1}(k), s_0(k), \ldots, s_{n-1}(k)] \\
&= [b_0(k), r_1(k), r_2(k), r_3(k), s_0(k)]
\end{aligned} \quad \text{Eq. 1-3}$$

$$\begin{aligned}
\zeta^T(k) &= [u(k), \ldots, u(k-m-d+1), y(k), \ldots, y(k-n+1)] \\
&= [u(k), u(k-1), u(k-2), u(k-3), y(k)]
\end{aligned} \quad \text{Eq. 1-4}$$

The controller parameter vector (controller parameters) $\hat{\theta}(k)$ is calculated by Eq. 2 shown. In Eq. 2, $\Gamma(k)$ is a gain matrix (the (m+n+d)th order square matrix) that determines the estimation/identification speed of the controller parameter $\hat{\theta}$ and e asterisk is a signal indicating the generalized estimation/identification error. They are represented by recursion formulas such as those of Eqs. 3 and 4:

$$\hat{\theta}(k) = \hat{\theta}(k-1) + \Gamma(k-1)\zeta(k-d)e^*(k) \quad \text{Eq. 2}$$

$$\Gamma(k) = \frac{1}{\lambda_1(k)} \left[ \Gamma(k-1) - \frac{\lambda_2(k)\Gamma(k-1)\zeta(k-d)\frac{\zeta^T(k-d)\Gamma(k-1)}{\lambda_1(k) + \lambda_2(k)\zeta^T(k-d)}}{\Gamma(k-1)\zeta(k-d)} \right] \quad \text{Eq. 3}$$

$$e^*(k) = \frac{D(z^{-1})y(k) - \hat{\theta}^T(k-1)\zeta(k-d)}{1 + \zeta^T(k-d)\Gamma(k-1)\zeta(k-d)} \quad \text{Eq. 4}$$

Various specific algorithms are given depending on the selection of $\lambda_1$, $\lambda_2$ in Eq. 3. $\lambda 1(k)=1$, $\lambda 2(k)=\text{lambda}$ ($0<\text{lambda}<2$) gives the gradually-decreasing gain algorithm (least square method when lambda=1) and $\lambda 1(k)=\text{lambda 1}$ ($0<\text{lambda 1}<1$), $\lambda 2(k)=\text{lambda 2}$ ($0<\text{lambda 2}<\text{lambda}$) gives the variable-gain algorithm (weighted least square method when lambda 2=1). Further, defining $\lambda 1(k)/\lambda 2(k)=\sigma$ and representing lambda 3 as in Eq. 5, the constant-trace algorithm is obtained by defining $\lambda 1(k)=\lambda 3(k)$. Moreover, $\lambda 1(k)=1$, $\lambda 2(k)=0$ gives the constant-gain algorithm. As is clear from Eq. 3, in this case $\Gamma(k)=\Gamma(k-1)$, resulting in the constant value $\Gamma(k)=\Gamma$.

$$\lambda_3(k) = 1 - \frac{\|\Gamma(k-1)\zeta(k-d)\|^2}{\sigma + \zeta^T(k-d)\Gamma(k-1)\zeta(k-d)} \cdot \frac{1}{tr\Gamma(0)} \quad \text{Eq. 5}$$

In the diagram of FIG. 4, the STR controller (adaptive controller) and the adaptation mechanism (system parameter estimator) are placed outside the system for calculating the quantity of fuel injection and operate to calculate the feedback correction coefficient KSTR(k) so as to adaptively bring the detected value KACT(k) to the desired value KCMD(k–d') (where d' is the dead time before KCMD is reflected in KACT as mentioned repeatedly). In other words, the STR controller receives the coefficient vector $\hat{\theta}(k)$ adaptively estimated/identified by the adaptation mechanism and forms a feedback compensator so as to bring it to the desired value KCMD(k–d'). The basic quantity of fuel injection Tim is multiplied by other correction terms KCMDM(k), KTOTAL (both explained later) and the calculated feedback correction coefficient KSTR(k) and the corrected quantity of fuel injection is supplied to the controlled plant (internal combustion engine) as the output quantity of fuel injection Tout(k).

Thus the adaptive feedback correction coefficient KSTR(k) and the detected value KACT(k) are determined and input to the adaptation mechanism, which calculates the controller parameter vector $\hat{\theta}(k)$ which is input to the STR controller. The desired value KCMD(k) is applied as input to the STR controller. Based on these variables, the STR controller uses a recursion formula to calculate the feedback correction coefficient KSTR(k) so as to bring the detected value KACT(k) to the desired value KCMD(k). The feedback correction coefficient KSTR(k) is specifically calculated as shown by Eq. 6:

$$KSTR(k) = \frac{KCMD(k-d') - s_0 \times y(k) - r_1 \times KSTR(k-1) - r_2 \times KSTR(k-2) - r_3 \times KSTR(k-3)}{b_0} \quad \text{Eq. 6}$$

As explained in the foregoing, the detected value KACT(k) and the desired value KCMD(k) are also input to the PID controller (second feedback correction coefficient calculation means)(illustrated as PID in the figure), which calculates the PID correction coefficient KLAF(k) based on the PID control law explained in connection with S104 in FIG. 5 flowchart so as to eliminate the control error between the detected value at the exhaust system confluence point and the desired value. One or the other of the feedback correction coefficient KSTR obtained by the adaptive control law and the PID correction coefficient KLAF obtained using the PID control law is selected to be used in determining the fuel injection calculation quantity by a switching mechanism 400 shown in FIG. 4.

Again returning to FIG. 11 and explaining the procedure at S502, the adaptive correction coefficient KSTR is basically calculated in the manner shown in Eq. 6. Here, the fact that the decision at S500 is YES indicates that the PID correction coefficient KLAF was used for the correction at the last control cycle. And when KLAF is used for correction, the adaptive correction coefficient KSTR will be fixed to 1.0 as will be explained later. When the correction by the adaptive correction coefficient KSTR is again resumed, as a result, the controlled variable would be unstable if the value of KSTR deviates greatly from 1.0.

In the configuration illustrated in FIG. 4, factors constituting the STR controller, i.e., the scalar quantity $\hat{b}_0^{-1}(k)$ that determines the gain, control factor $\hat{B}_R(Z^{-1},k)$ that uses the manipulated variable and control factor $\hat{S}(Z^{-1},k)$ that uses the controlled variable, are expressed as Eq. 7 to Eq. 9.

$$\hat{b}_0^{-1}(k) = 1/b_0 \quad \text{Eq. 7}$$

$$\hat{B}_R(Z^{-1},k) = r_1 z^{-1} + r_2 z^{-2} + \ldots + r_{m+d-1} z^{-(m+d-1)} \quad \text{Eq. 8}$$
$$= r_1 z^{-1} + r_2 z^{-2} + r_3 z^{-3}$$

$$\hat{S}(Z^{-1},k) = s_0 + s_1 z^{-1} + \ldots + s_{n-1} z^{-(n-1)} \quad \text{Eq. 9}$$
$$= s_0$$

$$KSTR(k) = \left[ \frac{KCMD(k-d') - s_0 \times y(k) - r_1 \times KSTR(k-1) - r_2 \times KSTR(k-2) - r_3 \times KSTR(k-3)}{b_0} \right] \times \quad \text{Eq. 10}$$
$$= 1 \times KLAF(k-1)$$
$$= KLAF(k-1)$$

As shown in Eq. 10, if the scalar quantity is in advance divided by KLAF(k–1) (PID correction coefficient at the preceding control cycle), the first term in the equation is 1 and the second term (KLAF(k–1)) will immediately be the value of KSTR(k) (the adaptive correction coefficient at the current control cycle), provided that the controller parameters are held such that KSTR=1.0. This ensures smooth switching from KLAF to KSTR.

In FIG. 11, the program then moves to S506 in which KSTR(k) just calculated is set as the feedback correction coefficient, to S508 in which the flag's bit is set to 1 to announce that the fuel injection quantity correction is to be made using KSTR.

Returning to FIG. 3, next in S26, the basic quantity of fuel injection Tim is multiplied by the value KCMDM, the calculated feedback correction coefficient KFB and the correction coefficients KTOTAL, and the addition term TTOTAL is added to the result to obtain the corrected output quantity of fuel injection Tout in the manner described earlier. The output quantity fuel injection Tout is then output to the drive circuit 82 of the fuel injector 22 as the manipulated variable in S28.

Here, KCMDM is a correction coefficient and is determined based on the desired air/fuel ratio (more precisely the equivalence ratio) KCMD. Specifically, in order to correct the quantity of fuel injection by the desired air/fuel ratio through multiplication, the air/fuel ratio is determined as the equivalence ratio and is adjusted by the charging efficiency. More specifically, since the charging efficiency of intake air varies as the evaporation heat varies. For this reason, the value KCMD is adjusted by this and is renamed as KCMDM.

The other correction coefficient KTOTAL is the total value of the coefficients of the various corrections for coolant temperature, etc., conducted by multiplication terms and TTOTAL indicates the total value of the various corrections for atmospheric pressure, etc., conducted by addition terms (but does not include the injector dead time, etc., which is added separately at the time of outputting the output quantity of fuel injection Tout).

Since open-loop control of the air/fuel ratio goes into effect if the result is NO in S18, in this case the value of the feedback correction coefficient KFB is set to 1.0 in S30 and the output quantity of fuel injection Tout is calculated in S26. Since open-loop control is also implemented when S12 finds that the engine is cranking, in this case the output quantity of fuel injection Tout is calculated retrieving the quantity of fuel injection at cranking Ticr in S32 and based on a start mode equation using Ticr in S34. If S14 finds that fuel cutoff is effected, the output quantity of fuel injection Tout is set to 0 in S36.

In this embodiment, when open-loop control of the fuel metering and air/fuel ratio is discontinued and feedback control is resumed, as in the case where the supply of fuel is resumed after once being cut off, the feedback correction coefficient is determined based on the PID control law for a prescribed period. As a result, the feedback correction coefficient of high control response determined by the adaptive control law is not used during periods when the difference between the true air/fuel ratio and the detected air/fuel ratio is large owing to the time required for the supplied fuel to be combusted and to the detection delay of the sensor itself. The controlled variable therefore does not become unstable and degrade the stability of the control.

On the other hand, the convergence speed can be improved after the detected value has stabilized by using the feedback correction coefficient of high control response determined by the adaptive control law for operating the system so as to absorb the control error all at one time. A particularly notable feature of the embodiment is that an optimal balance is achieved between control stability and control convergence owing to the fact that the control convergence is improved by determining the manipulated variable as the product of the feedback correction coefficient and the manipulated variable.

In addition, since the quantity of fuel injection is corrected using the low-control-response PID correction coefficient KLAF when the engine is equipped with the variable valve timing mechanism which switches the valve timing between two characteristics for lower-engine-speed and for high-engine-speed, and when the latter valve timing characteristic is selected, the feedback correction coefficient can be determined appropriately even if intake air escaped through the exhaust valve. Moreover, since it is arranged such that the valve timing is switched to the high-engine-speed characteristic after the confirmation that the fuel injection correction coefficient by the PID correction coefficient KLAF is in effect, the proper determination of the feedback correction coefficient is further enhanced.

Figure 12:
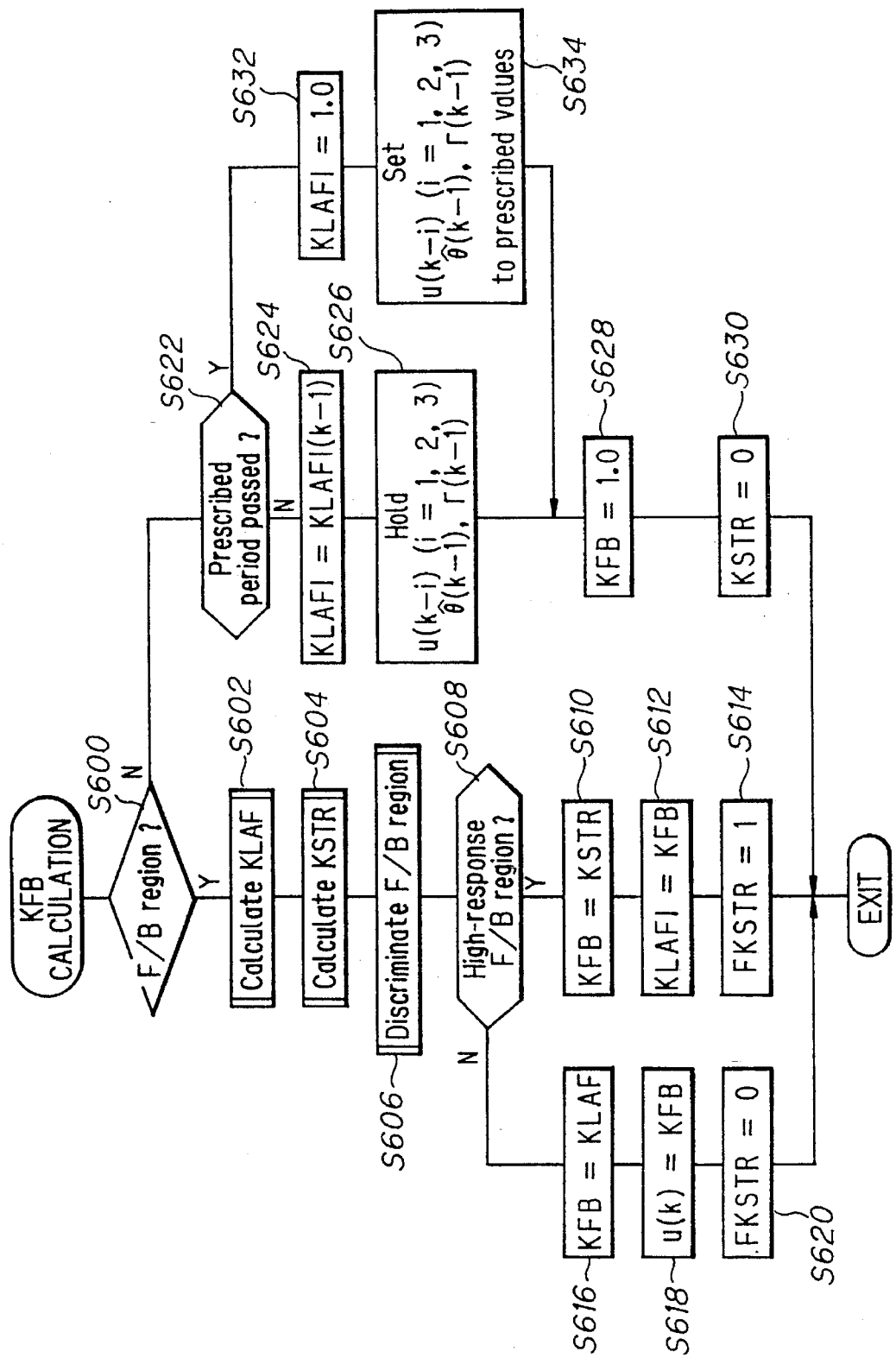
FIG. 12 is a subroutine flowchart, similar to FIG. 5, but showing the calculation of the feedback correction coefficient KFB according to a second embodiment of the invention.
Figure 15:
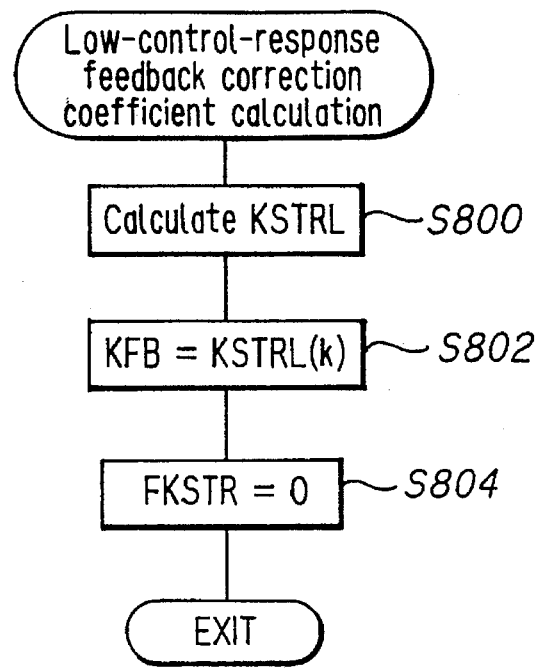
FIG. 15 is a subroutine flowchart, similar to FIG. 6, but showing the calculation of the low-control-response correction coefficient according to a fourth embodiment of the invention.

FIG. 12 is a flowchart, similar to FIG. 15, but showing the feedback correction coefficient calculation according to a second embodiment of the invention.

The second embodiment is configured such that the STR controller and the PID controller are operated in parallel so as to calculate the adaptive correction coefficient KSTR and the PID correction coefficient KLAF in parallel.

Specifically, the adaptation mechanism indicated by Eqs. 2 to 4 is input with intermediate variables zeta (k–d), namely, with vectors lumping together the current and past control values u(k)=KSTR(k) and y(k)=KACT(k), and calculates the system parameters $\hat{\theta}(k)$ from the cause and effect relationship therebetween. u(k) used here is the aforesaid feedback correction coefficient used in the fuel injection quantity calculation.

Under a condition where PID control is to be conducted instead of adaptive control in the next control cycle, the PID correction coefficient KLAF is used as the feedback correction coefficient. While conducting PID control, even if the input u(k) to the adaptation mechanism is changed from the adaptive correction coefficient KSTR(k) to KLAF(k), since the plant output (controlled variable) generated in accordance with the feedback correction coefficient and used for fuel metering control, namely KACT(k+d'), is output and since the cause-effect relationship is therefore established between the input and output, the adaptation mechanism can calculate the controller parameter vector $\hat{\theta}(k)$ without divergence. Thus, when $\hat{\theta}(k)$ is input to Eq. 6, KSTR(k) is calculated. At this time, the replacement KSTR(k–i)= KLAF(k–i) is permissible in the calculation of KSTR(k) (i=1, 2, 3).

Thus the adaptive correction coefficient KSTR can be calculated even when the PID controller is operating and it has been confirmed that the PID correction coefficient KLAF and the adaptive correction coefficient KSTR are substantially identical at any particular time. Since the values of the PID correction coefficient KLAF and the adaptive correction coefficient KSTR are close, moreover, the switch between them is smooth.

Based on the above, the second embodiment will be explained with reference to FIG. 12.

The program begins at S600 in which it is checked whether the engine operating condition is in the feedback control region. This is done in the manner similar to that described with reference to S300 earlier.

If the result in S600 is YES, the program proceeds to S602 in which the PID correction coefficient KLAF is calculated in the same manner as in the first embodiment, to S604 in which the adaptive correction coefficient KSTR is calculated similarly to the first embodiment, to S606 in which the operation region is discriminated in the same manner as that shown in FIG. 7 in the first embodiment. The program then proceeds to S608 in which it is checked whether the region is determined to be the high-response feedback region and if it is, the feedback correction coefficient KFB is set to the adaptive correction coefficient KSTR in S610, whereafter the I term of the PID correction coefficient is set to or replaced with the feedback correction coefficient KFB in S612 similarly to the procedure at S202 in the FIG. 6 flowchart. Next, in S614, the flag FKSTR's bit is set to 1 to indicate that the quantity of fuel injection is corrected using the adaptive correction coefficient KSTR.

On the other hand, if S608 finds that the operating condition is not in the high-response region, the feedback correction coefficient KFB is set to the PID correction coefficient KLAF in S616 and the plant input u(k) is set to the feedback correction coefficient KFB in S618, which will be input to the STR controller as shown in FIG. 4. This is because even outside the STR control region, the STR controller continues to operate using the PID correction coefficient KLAF. The bit of the flag FKSTR is then reset to 0 in S620.

If S600 finds that the operating condition is not in the feedback region, the program goes to S622 in which a check is made as to whether or not a prescribed period or time has passed since leaving the feedback region. If the result is NO, the program goes to S624 where the value of KLAF in the current control cycle is set to or replaced with KLAFI(k−1), the value of the I term in the preceding control cycle, which is to say that the I term is held. Next, in S626, the internal variables (intermediate variables) of the adaptive controller are similarly held at the preceding value, i.e., the final value during adaptive control.

This is because, as shown in FIG. 4, the calculation of zeta(k) uses the plant input $\underline{u}$, not only the control input u(k) at the current control cycle but also u(k−1) and other past values in preceding control cycles. Therefore, $\underline{i}$ of u(k−i) in S626 is a comprehensive symbol encompassing the current and past control values. The procedure at S126 thus means that u(k), u(k−1), u(k−2) and u(k−3), more precisely, u(k−1), u(k−2), u(k−3) and u(k−4) are held. The system parameters $\hat{\theta}$ and the gain matrix $\Gamma$ are simply held at their preceding values. In a case such as when the controller parameters (controller parameter vector) $\hat{\theta}$ and the gain matrix $\Gamma$ are stored in memory as mapped values, the map value can be used in place of the held value. Further, though not shown in the drawings, KSTR and KACT are also held at the final values in adaptive control. KACT and input u(k−i) can of course be lumped together and held as zeta.

Next, in S628, the value of the feedback correction coefficient KFB is set to 1.0, which is to say that feedback control is not conducted. The bit of the flag FKSTR is then reset to 0 in S630.

On the other hand, if S622 finds that the prescribed period has passed since leaving the feedback region, the value of the I term KLAFI is set to 1.0 (initial value) in S632, whereafter the plant input $\underline{u}$, the system parameters $\hat{\theta}$ and the gain matrix $\Gamma$ are set to prescribed values, e.g., their initial values in S634. The plant input $\underline{u}$ is specifically set to u(k)=u(k−1)=u(k−3)=1.

This is related to a frequently encountered situation. Namely, shortly after the accelerator pedal has once been released, fuel cutoff effected and open-loop control implemented, it often happens that the accelerator pedal is soon depressed again, causing the engine to accelerate and feedback control to be resumed. When feedback control is resumed after only a short time in this way, almost no change arises in the operating condition of the engine between before and after the non-operating region of the STR controller and, therefore, the cause-effect relationship with the combustion history naturally holds.

In the case of a transitory region of this kind, therefore, holding the internal variables of the adaptive controller improves the control stability by maintaining the continuity of the adaptive control and enabling the adaptive control to be conducted without unnecessarily returning to the initial state. In this sense, the prescribed period referred to regarding S622 defines a time range during which the cause-effect relationship with the combustion history continues to hold. The term "period" used here is defined to include both intervals measured in time and intervals measured in control (program) cycles (number of combustion cycles, TDCs etc.).

When the prescribed period or longer has passed, on the other hand, in can be assumed that a large change has occurred in the operating state of the engine between before and after the non-operating region of the STR controller. In this case, therefore, the I term of the PID correction coefficient is set to 1.0 in S632 and the internal variables are returned to prescribed values, for instance, their initial values, in S634. An initial value of $\hat{\theta}$(k−1) and u(k) (=KSTR(k)) can be stored in memory for each operating region of the internal combustion engine and the stored values can be used as the past values of $\hat{\theta}$(k−1) and zeta (k−d). This further improves the controllability at resumption of adaptive control. In addition, $\hat{\theta}$(k) can be learned for each operating region.

In the second embodiment, since the STR controller and the PID controller are operated in parallel while mutually replacing the internal variables so as to calculate the adaptive correction coefficient KSTR and the PID correction coefficient KLAF in parallel, the transition from the adaptive correction coefficient KSTR to the PID correction coefficient KLAF and vice versa can be smoothly conducted. Further, the fact that switching between the two types of correction coefficients can be conducted with the desired timing makes it possible to achieve optimum switching, while the fact that the switching can be conducted without producing spikes in the air/fuel ratio results in improved fuel metering and air/fuel ratio controllability.

Figure 13:
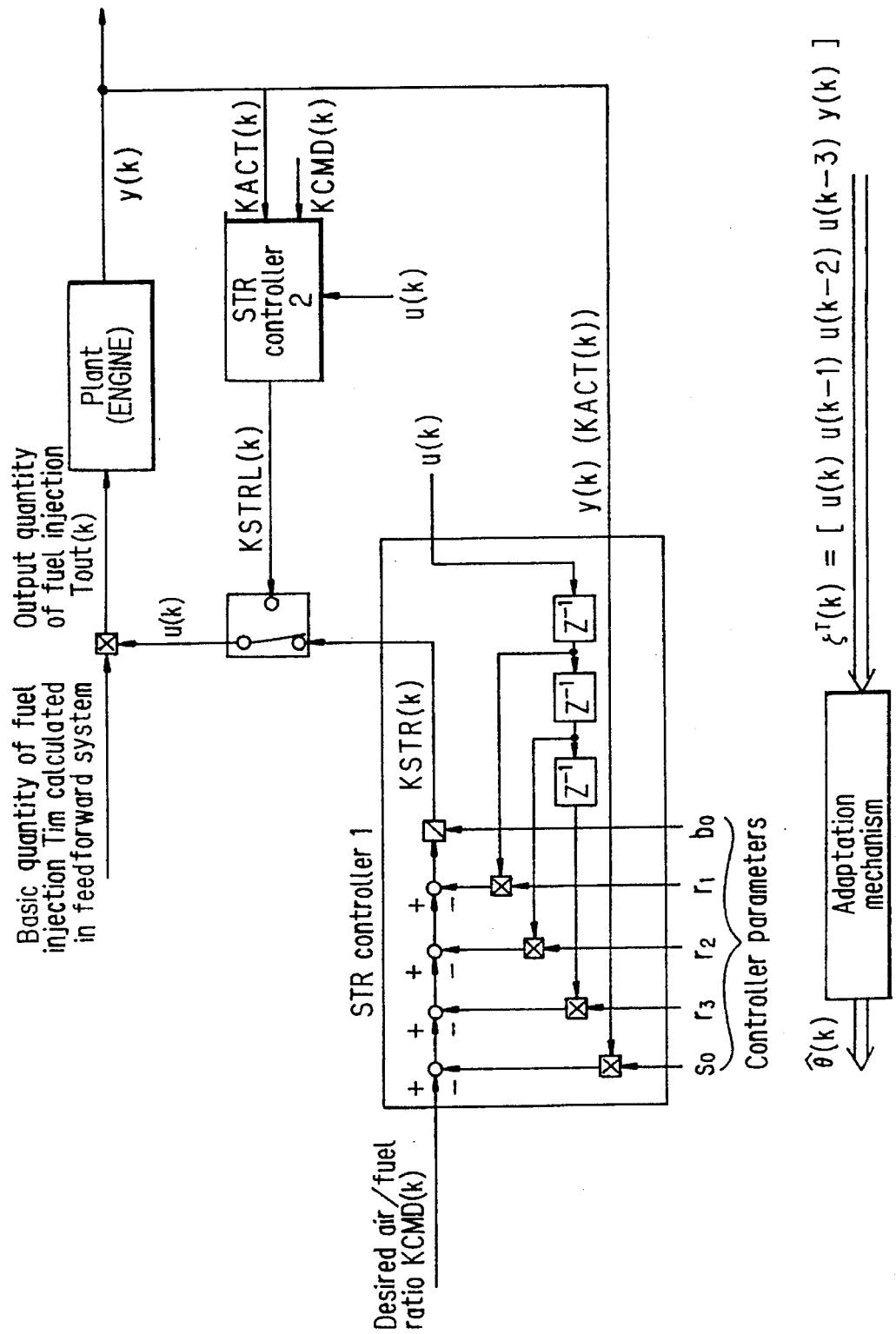
FIG. 13 is a block diagram, similar to FIG. 4, but showing the configuration of the system according to a third embodiment of the invention.
Figure 14:
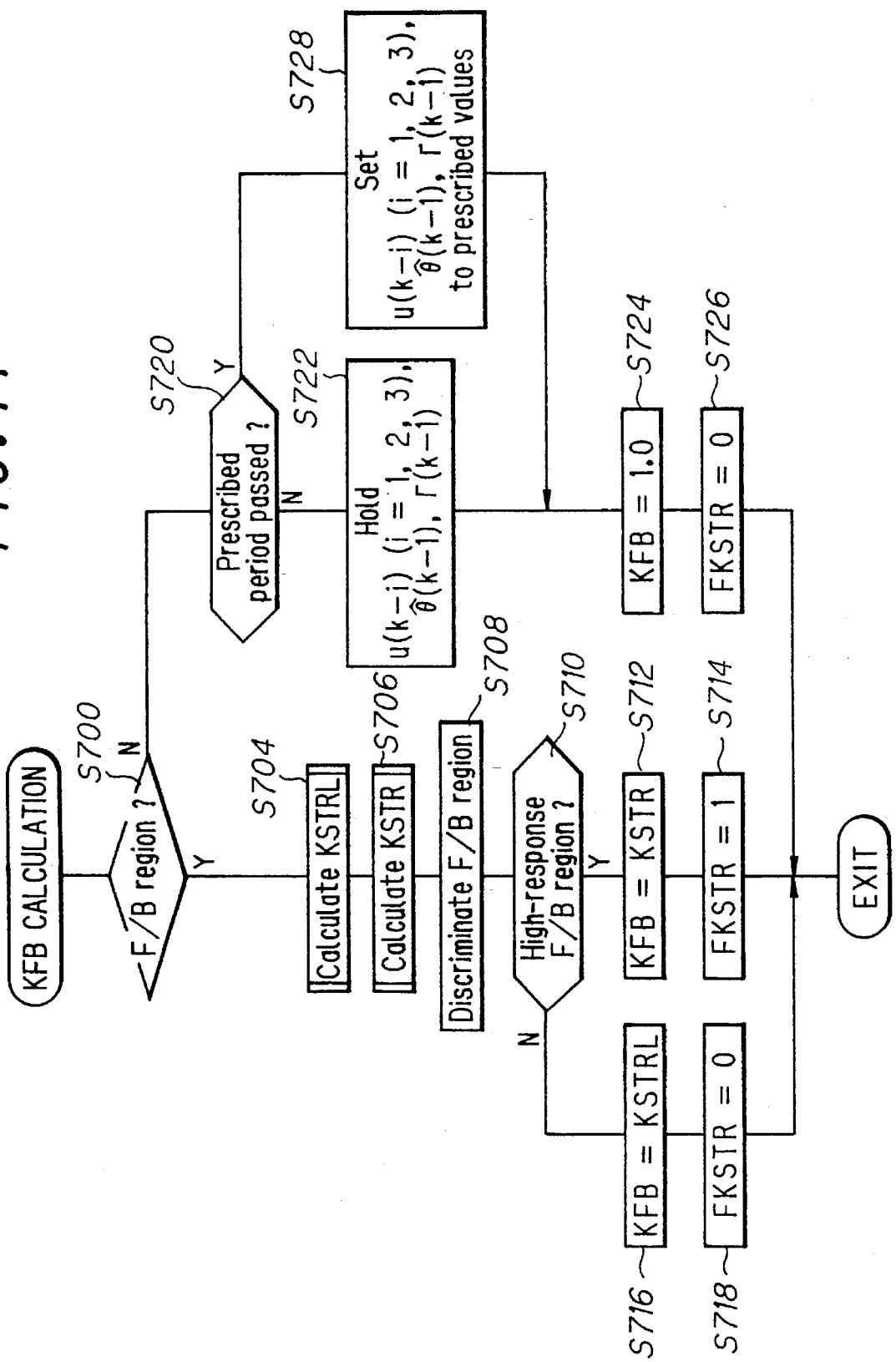
FIG. 14 is a subroutine flowchart, similar to FIG. 5, but showing the calculation of the feedback correction coefficient KFB according to the third embodiment of the invention.

FIG. 13 is a block diagram of a third embodiment of the invention and FIG. 14 is the flowchart of a subroutine for another method of calculating the feedback correction coefficient KFB in the third embodiment.

As shown in FIG. 13, the third embodiment has no PID controller but is provided with a second STR controller in addition to the STR controller of the first embodiment. (The STR controller corresponding to that in the first embodiment will be referred to as STR controller 1 and the second STR controller as STR controller 2.)

The relationship in control response between the feedback correction coefficient determined by the STR controller 1 (called the first adaptive correction coefficient KSTR) and the feedback correction coefficient determined by the STR controller 2 (called the second adaptive correction coefficient KSTRL) is defined as:

KSTR>KSTRL.

In other words, the gain of the second feedback correction coefficient KSTRL determined by the STR controller 2 is smaller and its control response is therefore lower.

The higher/lower gains (response) of the STR controllers 1 and 2 are achieved by using different algorithms, namely, the variable-gain algorithm and the constant-gain algorithm. More specifically, the STR controller 1 uses the variable-gain algorithm to enhance convergence speed while the STR controller 2 uses the constant-gain algorithm to set the aforementioned gain matrix $\Gamma$ to a lower gain, thus increasing stability. Instead, and more simply, it is possible to use the constant-gain algorithms in both controllers but make the gain matrices different. In this case it suffices to make:

Gain matrix $\Gamma$ of STR controller 1>Gain matrix $\Gamma$ of STR controller 2.

FIG. 14 is a subroutine flowchart showing the operation of the third embodiment. The subroutine according to FIG. 14 is similar to that of FIG. 12. Unless expressly stated otherwise, the steps of the subroutine of FIG. 14 conduct the same processing operations as the corresponding steps of FIG. 12.

First, in S700, it is discriminated whether the operating condition is in the feedback control region. If the result is YES, the second adaptive correction coefficient KSTRL and the first adaptive correction coefficient KSTR are calculated in S704 and S706 by the same procedures as explained regarding the earlier embodiments, whereafter the type of feedback region is discriminated in S708, and it is checked in S710 whether the operating condition is in the high-response feedback region, and if the result is YES, the feedback correction coefficient KFB is set to the first adaptive correction coefficient KSTR in S712 and the bit of the flag FKSTR is set to 1 in S714. If S710 finds that the operating condition is not in the high-response feedback region, the feedback correction coefficient KFB is set to the second adaptive correction coefficient KSTRL in S716 and the bit of the flag FKSTR is reset to 0 in S718.

On the other hand, if S700 finds that the operating condition is not in the feedback region, then, similarly to the subroutine of the first embodiment shown in FIG. 12, it is checked in S720 whether the prescribed period has passed since leaving the feedback region. If the result is NO, then, similarly to the subroutine of the first embodiment shown in FIG. 12, the values of the internal variables are held at the values of the preceding cycle in S722. The procedures with respect to the internal variables are conducted for both the first adaptive correction coefficient KSTR and the second adaptive correction coefficient KSTRL.

Next, in S724, the value of the feedback correction coefficient KFB is set to 1.0 and the bit of the flag FKSTR is then reset to 0 in S726. On the other hand, if the result in S720 is YES, the internal variables are set to prescribed values (the initial values) in S728. The values of the plant input u(k−1), the system parameters θ̂(k−1) and the gain matrix Γ(k−1) among the internal variables are set to different prescribed values in the first and second adaptive correction coefficients KSTR and KSTRL (although identical values can be used except for gain matrix Γ(k−1)).

Since, as described in the foregoing, the third embodiment is configured to calculate two feedback correction coefficients, different in control response, in parallel using two types of control laws, which are both adaptive control laws, and selects one or the other thereof based on the engine operating condition, effects like those of the first embodiment can be obtained.

Figure 16:
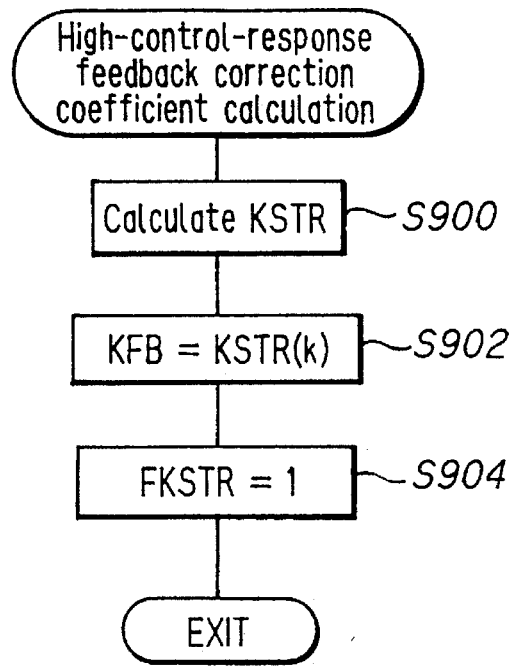
FIG. 16 is a subroutine flowchart, similar to FIG. 11, but showing the calculation of the high-control-response feedback correction coefficient according to the fourth embodiment.
Figure 17:
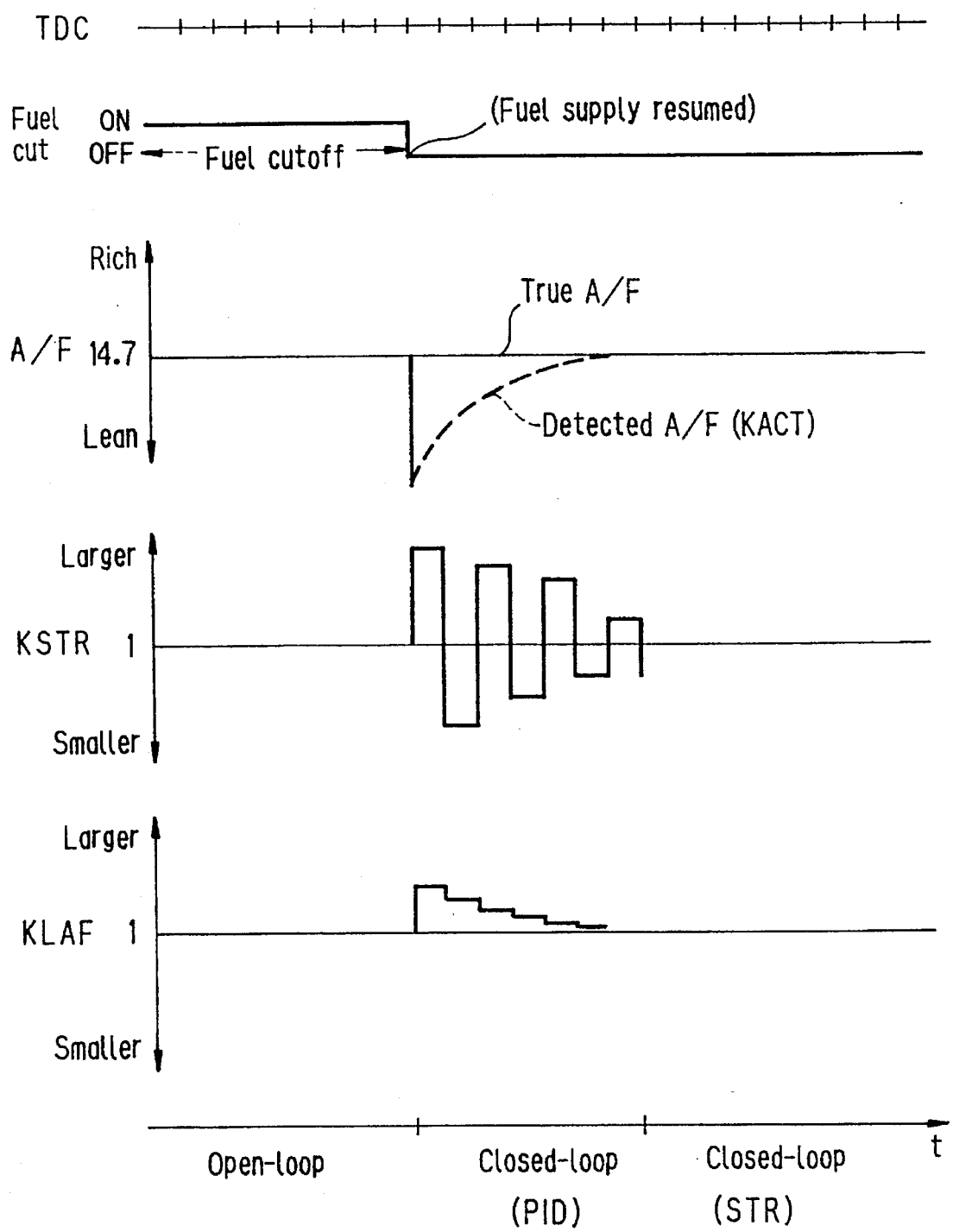
FIG. 17 is a timing chart showing the air/fuel ratio detection delay when the fuel supply is resumed after the fuel was cut off.

FIGS. 15 and 16 are flowcharts, similar to FIGS. 6 and 11 in the first embodiment, but showing a fourth embodiment of the invention.

In the fourth embodiment, two STR controllers are provided, similar to the third embodiment, each of which calculates the low-control-response feedback correction coefficient and the high-control-response feedback correction coefficient based on the two types of the adaptive control laws.

Specifically, the fourth embodiment is arranged such that in the flowchart of FIG. 15, the second adaptive correction coefficient KSTRL is calculated at S800 in the same manner as in the third embodiment, while the first adaptive correction coefficient KSTR is calculated at S900 of the FIG. 16 flowchart in a similar manner to the foregoing embodiments. The rest of the procedures at S802 to S804 and S902 to S904 are the same as those in the first embodiment.

With the arrangement, the fourth embodiment can have the same effect as that of the first embodiment.

Although the third and fourth embodiments have been described as having two STR controllers, it is alternatively possible to use only one STR controller, use the constant-gain algorithm, and raise and lower the gain by changing the set value of Γ.

While PID control has been taken as an example in the first and second embodiments, it is permissible instead to appropriately set the KP, KI and KD gains for conducting PI control and to control only the I term. In other words, the PID control referred to in the specification is established insofar as it includes some of the gain terms.

While the air/fuel ratio, more precisely the equivalence ratio, has been used as the desired value in the first to fourth embodiments, the quantity of fuel injection can instead be used as the desired value.

While the correction coefficients KSTR and KLAF(KSTRL) have been calculated as multiplication coefficients (terms) in the first to fourth embodiments, they can instead be calculated as addition terms.

While the throttle valve is operated by a stepping motor in the first to third embodiments, it can instead be mechanically linked with the accelerator pedal and be directly operated in response to accelerator pedal depression.

Moreover, while the first to fourth embodiments were described with respect to examples using one or more STRs as the adaptive controller(s), one or more MRACS (model reference adaptive control systems) can be used instead.

While the invention has thus been shown and described with reference to the specific embodiments, it should be noted that the invention is in no way limited to the details of the described arrangements, changes and modifications may be made without departing from the scope of the appended claims.

What is claimed is:

1. A system for controlling fuel metering for an internal combustion engine, comprising:

air/fuel ratio detecting means for detecting an air/fuel ratio (KACT) of an exhaust gas of the engine;

engine operating condition detecting means for detecting an operating condition of the engine;

fuel injection quantity determining means for determining a quantity of fuel injection (Tim) to be supplied to the engine;

first feedback correction coefficient calculation means for calculating a first feedback correction coefficient (KSTR) using a first control law having an algorithm expressed in a recursion formula;

second feedback correction coefficient calculation means for calculating a second feedback correction coefficient (KLAF(KSTRL)), whose control response is inferior to that of the first feedback correction coefficient, using a second control law;

switching means for switching the first feedback correction coefficient (KSTR) and the second feedback correction coefficient (KLAF(KSTRL)) therebetween; and feedback control means for correcting a manipulated variable by the switched one of the feedback correction coefficients (KSTR, KLAF(KSTRL)) to bring at least one of the detected air/fuel ratio (KACT) and the quantity of fuel injection (Tim) to a desired value (KCMD);

wherein the improvement comprising:

said engine being provided with a mechanism having an actuator which switches an operating condition of an engine valve;

engine valve operation switching means being provided for switching the operating condition of the engine valve through the actuator between a first characteristic (LoV/T) for a low engine speed and a second characteristic (HiV/T) for a high engine speed; and said feedback control means correcting the manipulated variable by the second feedback correction coefficient (KLAF(KSTRL)) when said engine valve operation switching means switches the operating condition of the engine valve to the second characteristic (HiV/T).

2. A system according to claim 1, wherein said engine valve operation switching means switches the operating condition of the engine valve to the second characteristic (HiV/T) after it has been confirmed that said feedback control means corrected the manipulated variable by the second feedback correction coefficient (KLAF(KSTRL).

3. A system according to claim 2, wherein said engine valve operation switching means switches the operating condition of the engine valve to the second characteristic (HiV/T) after a predetermined time has passed since it had been confirmed that said feedback control means corrected the manipulated variable by the second feedback correction coefficient (KLAF(KSTRL)).

4. A system according to claim 1, wherein said engine valve operation switching means switches the operating condition of the engine valve in response to the detected operating condition of the engine.

5. A system according to claim 1, said first and second feedback correction coefficient calculation means calculate the feedback correction coefficients (KSTR, KLAF(KSTRL)) at least parallel with each other.

6. A system according to claim 5, wherein said first and second feedback correction coefficient calculation means calculate the feedback correction coefficients (KSTR, KLAF (KSTRL)) in parallel all the time.

7. A system according to claim 5, wherein said switching means replaces at least one variable of one feedback correction coefficient (KSTR, KLAF(KSTRL)) with a value to be used in a calculation of the other feedback correction coefficient (KLAF(KSTRL), KSTR).

8. A system according to claim 5, wherein said switching means replaces one feedback correction coefficient (KSTR, KLAF(KSTRL)) with the other feedback correction coefficient (KLAF(KSTRL), KSTR).

9. A system according to claim 5, wherein said switching means replaces one feedback correction coefficient (KSTR, KLAF(KSTRL)) with a past value of the other feedback correction coefficient (KLAF(KSTRL), KSTR).

10. A system according to claim 9, wherein the past value is that used in the correction of the manipulated variable.

11. A system according to claim 2, said first and second feedback correction coefficient calculation means calculate the feedback correction coefficients (KSTR, KLAF(KSTRL)) at least parallel with each other.

12. A system according to claim 11, wherein said first and second feedback correction coefficient calculation means calculate the feedback correction coefficients (KSTR, KLAF (KSTRL)) in parallel all the time.

13. A system according to claim 11, wherein said switching means replaces at least one variable of one feedback correction coefficient (KSTR, KLAF(KSTRL)) with a value to be used in a calculation of the other feedback correction coefficient (KLAF(KSTRL), KSTR).

14. A system according to claim 11, wherein said switching means replaces one feedback correction coefficient (KSTR, KLAF(KSTRL)) with the other feedback correction coefficient (KLAF(KSTRL), KSTR).

15. A system according to claim 11, wherein said switching means replaces one feedback correction coefficient (KSTR, KLAF(KSTRL)) with a past value of the other feedback correction coefficient (KLAF(KSTRL), KSTR).

16. A system according to claim 15, wherein the past value is that used in the correction of the manipulated variable.

17. A system according to claim 1, wherein the first control law having an algorithm expressed in a recursion formula is an adaptive control law.

18. A system according to claim 2, wherein the first control law having an algorithm expressed in a recursion formula is an adaptive control law.

19. A system according to claim 1, wherein said second feedback correction coefficient calculation means calculates the second feedback correction coefficient (KLAF) using a PID control law at least including one from among a proportional term, an integral term and a differential term.

20. A system according to claim 2, wherein said second feedback correction coefficient calculation means calculates the second feedback correction coefficient (KLAF) using a PID control law at least including one from among a proportional term, an integral term and a differential term.

21. A system according to claim 1, wherein said second feedback correction coefficient calculation means calculates the second feedback correction coefficient (KSTRL) using a control law having an algorithm expressed in a recursion formula.

22. A system according to claim 21, wherein the control having an algorithm expressed in a recursion formula is an adaptive control law.

23. A system according to claim 2, wherein said second feedback correction coefficient calculation means calculates the second feedback correction coefficient (KSTRL) using a control law having an algorithm expressed in a recursion formula.

24. A system according to claim 23, wherein the control having an algorithm expressed in a recursion formula is an adaptive control law.

25. A system according to claim 1, wherein said feedback control means corrects the manipulated variable by multiplying the manipulated variable by one of the feedback correction coefficients (KSTR, KLAF(KSTRL)).

26. A system according to claim 2, wherein said feedback control means corrects the manipulated variable by multiplying the manipulated variable by one of the feedback correction coefficients (KSTR, KLAF(KSTRL)).

* * * * *